(12) United States Patent
Karube

(10) Patent No.: US 11,144,590 B2
(45) Date of Patent: Oct. 12, 2021

(54) SIMILAR DAMAGE SEARCH DEVICE AND A SIMILAR DAMAGE SEARCH METHOD

(71) Applicant: FUJIFILM Corporation, Tokyo (JP)

(72) Inventor: Mikihiko Karube, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 484 days.

(21) Appl. No.: 16/003,992

(22) Filed: Jun. 8, 2018

(65) Prior Publication Data

US 2018/0293255 A1    Oct. 11, 2018

Related U.S. Application Data

(63) Continuation of application No. PCT/JP2016/083192, filed on Nov. 9, 2016.

(30) Foreign Application Priority Data

Dec. 25, 2015 (JP) .............................. JP2015-254977

(51) Int. Cl.
*G06F 16/00* (2019.01)
*G06F 16/583* (2019.01)
(Continued)

(52) U.S. Cl.
CPC .......... *G06F 16/5838* (2019.01); *G06F 16/56* (2019.01); *G06F 16/583* (2019.01);
(Continued)

(58) Field of Classification Search
CPC ..... G06F 16/5838; G06F 16/583; G06F 16/56
(Continued)

(56) References Cited

U.S. PATENT DOCUMENTS 9,613,272 B2 * 4/2017 Kihara .................... G06K 9/627
9,721,302 B2 * 8/2017 Tofte ........................ G06Q 40/08
(Continued)

FOREIGN PATENT DOCUMENTS

JP    H06-148089 A    5/1994
JP    2002-257744 A   9/2002
(Continued)

OTHER PUBLICATIONS

R.S. Adhikari et al. (Image-Based Retrieval of Concrete Crack Properties for Bridges Inspection Automation in Construction, vol. 39, Apr. 1, 2014 (Apr. 1, 2014), p. 18-194 (see IDSsubmission filed on Feb. 6, 2019 of the U.S. Appl. No. 16/009,622,) (Year: 2014).*
(Continued)

*Primary Examiner* — Debbie M Le
(74) *Attorney, Agent, or Firm* — Studebaker & Brackett PC

(57) ABSTRACT

A similar damage search device includes a database that stores first damage information generated on the basis of a damage image of a structure, the first damage information including a damage vector obtained by vectorizing damage of the structure, and damage structure information including at least one of information on a hierarchical structure of the damage vector or information on a direction of the damage vector, an information acquisition unit that acquires second damage information corresponding to the first damage information on the basis of a damage image of a search target; and a search unit that searches for one or a plurality of pieces of first damage information similar to the second damage information from among the first damage information stored in the database on the basis of the second damage information acquired by the information acquisition unit.

11 Claims, 23 Drawing Sheets

(51) Int. Cl.
*G06F 16/56* (2019.01)
*G06K 9/62* (2006.01)
*G06T 7/00* (2017.01)
*G06K 9/52* (2006.01)

(52) U.S. Cl.
CPC .......... *G06K 9/6215* (2013.01); *G06T 7/0002* (2013.01); *G06K 9/527* (2013.01)

(58) Field of Classification Search
USPC ........................................................ 707/722
See application file for complete search history.

(56) References Cited

U.S. PATENT DOCUMENTS

| | | | |
|---|---|---|---|
| 10,580,080 B2* | 3/2020 | Rackley, III | G06Q 30/0645 |
| 10,937,138 B2* | 3/2021 | Karube | G01N 21/88 |
| 2008/0247636 A1* | 10/2008 | Davis | G06T 19/00 382/152 |
| 2016/0335727 A1* | 11/2016 | Jimenez | G06Q 30/0185 |
| 2017/0011186 A1 | 1/2017 | Oosawa | |
| 2019/0197442 A1* | 6/2019 | Lu | G06N 20/00 |
| 2020/0219069 A1* | 7/2020 | Gould | G06Q 10/20 |

FOREIGN PATENT DOCUMENTS

| | | |
|---|---|---|
| JP | 2005-250562 A | 9/2005 |
| JP | 4006007 B2 | 11/2007 |
| JP | 2015-095143 A | 5/2015 |
| JP | 2015-191287 A | 11/2015 |

OTHER PUBLICATIONS

International Search Report issued in PCT/JP2016/083192; dated Dec. 27, 2016.
International Preliminary Report on Patentability and Written Opinion issued in PCT/JP2016/083192; completed Apr. 11, 2017.
An Office Action mailed by the Japanese Patent Office dated Mar. 29, 2019, which corresponds to Japanese Patent Application No. 2017-557779 and is related to U.S. Appl. No. 16/003,992.

* cited by examiner

FIG. 11

| VECTOR GROUP ID | VECTOR ID | HIERARCHY (LEVEL) | START POINT | | TERMINATION POINT | | LENGTH (mm) | WIDTH (mm) | DELETION OPERATION FLAG | ADDITION OPERATION FLAG | PARENT VECTOR ID | SIBLING VECTOR ID | CHILD VECTOR ID | INSPECTION DATE | REPAIR | |
|---|---|---|---|---|---|---|---|---|---|---|---|---|---|---|---|---|
| | | | POINT NUMBER | COORDINATES | POINT NUMBER | COORDINATES | | | | | | | | | TYPE | REPAIR DATE |
| C1 | C1-1 | LEVEL 1 | P1 | (X1,Y1) | P2 | (X2,Y2) | 100 | 1 | 0 | 0 | - | - | C1-2<br>C1-3 | 12.18.2015 | R1 | 9.28.2015 |
| | C1-2 | LEVEL 2 | P2 | (X2,Y2) | P3 | (X3,Y3) | 50 | 1 | 0 | 0 | C1-1 | C1-3 | C1-4 | 12.18.2015 | R1 | 9.28.2015 |
| | C1-3 | LEVEL 2 | P2 | (X2,Y2) | P4 | (X4,Y4) | 30 | 0.5 | 0 | 0 | C1-1 | C1-2 | C1-5<br>C1-6 | 12.18.2015 | R2 | 9.28.2015 |
| | C1-4 | LEVEL 2 | P3 | (X3,Y3) | P5 | (X5,Y5) | 60 | 1 | 0 | 0 | C1-2 | - | - | 12.18.2015 | R2 | 9.28.2015 |
| | C1-5 | LEVEL 3 | P4 | (X4,Y4) | P6 | (X6,Y6) | 25 | 0.1 | 0 | 0 | C1-3 | C1-6 | - | 12.18.2015 | R3 | 9.28.2015 |
| | C1-6 | LEVEL 3 | P4 | (X4,Y4) | P7 | (X7,Y7) | 25 | 0.1 | 0 | 0 | C1-3 | C1-5 | - | 12.18.2015 | R3 | 9.28.2015 |

FIG. 14

| VECTOR GROUP ID | VECTOR ID | HIERARCHY (LEVEL) | TYPE | START POINT | | TERMINATION POINT | | LENGTH (mm) | WIDTH (mm) | DELETION OPERATION FLAG | ADDITION OPERATION FLAG | PARENT VECTOR ID | SIBLING VECTOR ID | CHILD VECTOR ID | INSPECTION DATE | REPAIR | |
|---|---|---|---|---|---|---|---|---|---|---|---|---|---|---|---|---|---|
| | | | | POINT NUMBER | COORDINATES | POINT NUMBER | COORDINATES | | | | | | | | | TYPE | REPAIR DATE |
| C1 | C1-1 | LEVEL 1 | TRUNK | P1 | (X1,Y1) | P2 | (X2,Y2) | 100 | 1 | 0 | 0 | - | - | C1-2 C1-3 | 12.18.2015 | R1 | 9.28.2015 |
| | C1-2 | LEVEL 1 | TRUNK | P2 | (X2,Y2) | P3 | (X3,Y3) | 50 | 1 | 0 | 0 | C1-1 | C1-3 | C1-4 | 12.18.2015 | R1 | 9.28.2015 |
| | C1-3 | LEVEL 2 | BRANCH | P2 | (X2,Y2) | P4 | (X4,Y4) | 30 | 0.5 | 0 | 0 | C1-1 | C1-2 | C1-5 C1-6 | 12.18.2015 | R2 | 9.28.2015 |
| | C1-4 | LEVEL 1 | TRUNK | P3 | (X3,Y3) | P5 | (X5,Y5) | 60 | 1 | 0 | 0 | C1-2 | - | - | 12.18.2015 | R2 | 9.28.2015 |
| | C1-5 | LEVEL 3 | LEAF | P4 | (X4,Y4) | P6 | (X6,Y6) | 25 | 0.1 | 0 | 0 | C1-3 | C1-6 | - | 12.18.2015 | R3 | 9.28.2015 |
| | C1-6 | LEVEL 3 | LEAF | P4 | (X4,Y4) | P7 | (X7,Y7) | 25 | 0.1 | 0 | 0 | C1-3 | C1-5 | - | 12.18.2015 | R3 | 9.28.2015 |

FIG. 18

| VECTOR GROUP ID | VECTOR ID | HIERARCHY (LEVEL) | START POINT POINT NUMBER | START POINT COORDINATES | TERMINATION POINT POINT NUMBER | TERMINATION POINT COORDINATES | LENGTH (mm) | WIDTH (mm) | DELETION OPERATION FLAG | ADDITION OPERATION FLAG | PARENT VECTOR ID | SIBLING VECTOR ID | CHILD VECTOR ID | INSPECTION DATE | REPAIR TYPE | REPAIR DATE |
|---|---|---|---|---|---|---|---|---|---|---|---|---|---|---|---|---|
| C1 | C1-1 | LEVEL 1 | P1 | (X1,Y1) | P2 | (X2,Y2) | 100 | 1 | 0 | 0 | - | - | C1-2<br>C1-3 | 3.1.2015 | R1 | 9.28.2015 |
|  | C1-2 | LEVEL 2 | P2 | (X2,Y2) | P3 | (X3,Y3) | 50 | 1 | 0 | 0 | C1-1 | C1-3 | C1-4 | 6.1.2015 | R1 | 9.28.2015 |
|  | C1-3 | LEVEL 2 | P2 | (X2,Y2) | P4 | (X4,Y4) | 30 | 0.5 | 0 | 0 | C1-1 | C1-2 | C1-5<br>C1-6 | 6.1.2015 | R2 | 9.28.2015 |
|  | C1-4 | LEVEL 3 | P3 | (X3,Y3) | P5 | (X5,Y5) | 60 | 1 | 0 | 0 | C1-2 | - | - | 9.1.2015 | R2 | 9.28.2015 |
|  | C1-5 | LEVEL 3 | P4 | (X4,Y4) | P6 | (X6,Y6) | 25 | 0.1 | 0 | 0 | C1-3 | C1-6 | - | 9.1.2015 | R3 | 9.28.2015 |
|  | C1-6 | LEVEL 3 | P4 | (X4,Y4) | P7 | (X7,Y7) | 25 | 0.1 | 0 | 0 | C1-3 | C1-5 | - | 9.1.2015 | R3 | 9.28.2015 |

FIG. 20

| VECTOR GROUP ID | VECTOR ID | HIERARCHY (LEVEL) | START POINT | | TERMINATION POINT | | LENGTH (mm) | WIDTH (mm) | DELETION OPERATION FLAG | ADDITION OPERATION FLAG | PARENT VECTOR ID | SIBLING VECTOR ID | CHILD VECTOR ID | INSPECTION DATE | REPAIR | |
|---|---|---|---|---|---|---|---|---|---|---|---|---|---|---|---|---|
| | | | POINT NUMBER | COORDINATES | POINT NUMBER | COORDINATES | | | | | | | | | TYPE | REPAIR DATE |
| C2 | C2-1 | LEVEL 1 | P8 | (X8,Y8) | P9 | (X9,Y9) | 100 | 1 | 0 | 0 | - | - | C2-2 | 12.18.2015 | R1 | 9.28.2015 |
| | C2-2 | LEVEL 1 | P9 | (X9,Y9) | P10 | (X10,Y10) | 120 | 1 | 0 | 0 | C2-1 | - | C2-3 | 12.18.2015 | R1 | 9.28.2015 |
| | C2-3 | LEVEL 1 | P10 | (X10,Y10) | P11 | (X11,Y11) | 100 | 0.5 | 0 | 0 | C2-2 | - | C2-4 | 12.18.2015 | R1 | 9.28.2015 |
| | C2-4 | LEVEL 1 | P11 | (X11,Y11) | P12 | (X12,Y12) | 110 | 1 | 0 | 0 | C2-3 | - | - | 12.18.2015 | R1 | 9.28.2015 |

FIG. 22

| LABEL NUMBER OF CRACK | LINE SEGMENT INFORMATION | | |
|---|---|---|---|
| | VECTOR ID | INDIVIDUAL DIRECTION | ENTIRE DIRECTION |
| C1-A | C1-1 | LONGITUDINAL | LONGITUDINAL |
| | C1-2 | LONGITUDINAL | |
| | C1-3 | LATERAL | |
| | C1-4 | LONGITUDINAL | |
| | C1-5 | LONGITUDINAL | |
| | C1-6 | LATERAL | |
| C1-B | C1-1 | LATERAL | LATERAL |
| | C1-2 | LATERAL | |
| | C1-3 | LONGITUDINAL | |
| | C1-4 | LATERAL | |
| | C1-5 | LATERAL | |
| | C1-6 | LONGITUDINAL | |

FIG. 23

| VECTOR GROUP ID | IMAGE ID | IMAGE DATA | DATE AND TIME OF ACQUISITION | WIDTH OF IMAGE (pixel) | HEIGHT OF IMAGE (pixel) | NUMBER OF CHANNELS | BIT/PIXEL | RESOLUTION (mm/pixel) | |
|---|---|---|---|---|---|---|---|---|---|
| | | | | | | | | X-DIRECTION | Y-DIRECTION |
| C1 | img_2015-001 | (IMAGE DATA OF img_2015-001) | 12.18.2015 | 5,000 | 3,500 | 3 | 64 | 0.5 | 0.5 |

| DATA/INFORMATION | FEATURE AMOUNT |
|---|---|
| DAMAGE VECTOR | · START POINT, TERMINATION POINT<br>· LENGTH<br>· WIDTH |
| INFORMATION ON HIERARCHICAL STRUCTURE OF DAMAGE VECTOR | · PARENT VECTOR ID<br>· SIBLING VECTOR ID<br>· CHILD VECTOR ID |
| INFORMATION ON DIRECTION OF DAMAGE VECTOR | · DIRECTION (LONGITUDINAL, LATERAL) WITH RESPECT TO STRUCTURE |

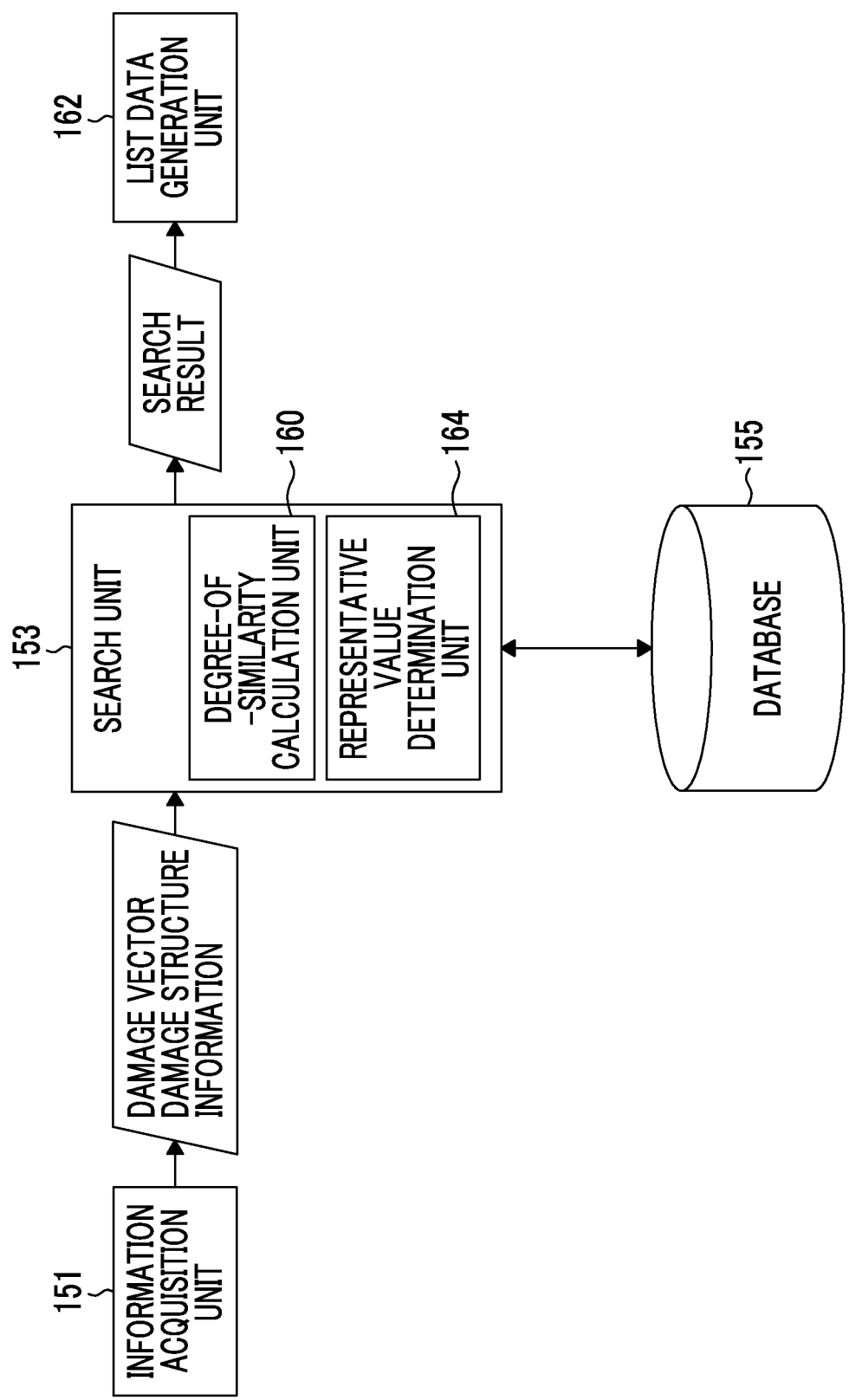

SIMILAR DAMAGE SEARCH DEVICE AND A SIMILAR DAMAGE SEARCH METHOD

CROSS-REFERENCE TO RELATED APPLICATIONS

The present application is a Continuation of PCT International Application No. PCT/JP2016/083192 filed on Nov. 9, 2016 claiming priority under 35 U.S.C § 119(a) to Japanese Patent Application No. 2015-254977 filed on Dec. 25, 2015. Each of the above applications is hereby expressly incorporated by reference, in their entirety, into the present application.

BACKGROUND OF THE INVENTION

1. Field of the Invention

The present invention relates to a similar damage search device and a similar damage search method, and more particularly, to a similar damage search device and a similar damage search method for performing search on the basis of information obtained from an image obtained by imaging a damage of a structure.

2. Description of the Related Art

In the related art, a technology for imaging damage such as a crack or a free lime generated in a structure using a camera and inspecting the structure using a captured image has been known.

For example, JP1994-148089A (JP-H06-148089A) describes a technology for generating information on coordinates and widths of cracks by imaging the cracks present on a surface of concrete or the like using a camera.

In addition, for example, JP 2005-250562A describes a technology of accumulating captured images of buildings or the like in a database and performing search for similar images using the database.

SUMMARY OF THE INVENTION

However, in a case where similar damage examples are searched for using a database in which images obtained by imaging damages are accumulated, it may be difficult to obtain a reasonable search result by merely performing the search on the basis of only a length or width of damage. That is, damage examples that are the same or are similar in only the length or width of the damage are merely searched for by merely performing search for similar damage examples on the basis of only the length or width of the damage, and it may be difficult to obtain appropriate search results including features of the damage. Therefore, in a case where similar damage examples are searched for, it may not possible to perform accurate search for similar damages in which features of damage are recognized unless the similar damage examples are searched for in additional consideration of information on a structure of the damage.

JP1994-148089A (JP-H06-148089A) and JP 2005-250562A do not mention searching for similar damage examples in additional consideration of information on a structure of the damage.

The present invention has been made in view of the above circumstances, and an object of the present invention is to provide a similar damage search device and a similar damage search method capable of performing accurate search for similar damage examples in which features of damage are recognized.

In order to achieve the above object, a similar damage search device according to an aspect of the present invention is a similar damage search device, comprising: a database that stores first damage information generated on the basis of a damage image of a structure, the first damage information including a damage vector obtained by vectorizing damage of the structure, and damage structure information including at least one of information on a hierarchical structure of the damage vector or information on a direction of the damage vector; an information acquisition unit that acquires second damage information corresponding to the first damage information on the basis of a damage image of a search target; and a search unit that searches for one or a plurality of pieces of first damage information similar to the second damage information from among the first damage information stored in the database on the basis of the second damage information acquired by the information acquisition unit.

According to this aspect, information described in the database is searched for on the basis of the damage vector obtained by vectorizing damage of the structure, and the damage structure information including at least one of the information on the hierarchical structure of the damage vector or the information on the direction of the damage vector. Accordingly, in this aspect, it is possible to perform accurate search in which features of damage are recognized.

Further, according to this aspect, the similar damage search device includes the database that stores the damage vector obtained by vectorizing the damage, and the damage structure information including at least one of the information on the hierarchical structure of the damage vector or the information on the direction of the damage vector. Accordingly, in this aspect, it is possible to perform accurate search in which features of damage are recognized.

Preferably, each of the damage vector, the information on the hierarchical structure of the damage vector, and the information on the direction of the damage vector includes one or a plurality of feature amounts, the similar damage search device comprises a feature amount determination unit that determines a feature amount to be used for search including at least the feature amount of the damage vector, and the search unit searches the database for one or a plurality of pieces of first damage information on the basis of the feature amount determined by the feature amount determination unit.

According to this aspect, each of the damage vector, the information on the hierarchical structure of the damage vector, and the information on the direction of the damage vector includes one or a plurality of feature amounts. Further, according to this aspect, the feature amount to be used for search including the feature amount of the damage vector is determined by the feature amount determination unit, and the search is performed. Accordingly, in this aspect, since the search for the similar damage is performed on the basis of the plurality of feature amounts of damages, it is possible to perform accurate search in which features of damage are recognized.

Preferably, the similar damage search device further comprises a degree-of-similarity calculation unit that calculates a degree of similarity between the second damage information acquired by the information acquisition unit and the first damage information stored in the database, wherein the search unit searches the database for one or a plurality of pieces of first damage information on the basis of the degree of similarity calculated by the degree-of-similarity calculation unit.

According to this aspect, the degree of similarity between the second damage information acquired by the information acquisition unit and the first damage information stored in the database is calculated by the degree-of-similarity calculation unit, and the search is performed on the basis of the calculated degree of similarity. Accordingly, in this aspect, it is possible to perform search for damage according to the degree of similarity.

Preferably, the similar damage search device further comprises a degree-of-similarity calculation unit that calculates a degree of similarity between the feature amount of the second damage information determined by the feature amount determination unit and the feature amount of the first damage information stored in the database, wherein the search unit searches the database for one or a plurality of pieces of first damage information on the basis of the degree of similarity calculated by the degree-of-similarity calculation unit.

According to this aspect, the degree of similarity between the feature amount of the second damage information determined by the feature amount determination unit and the feature amount of the first damage information stored in the database is calculated by the degree-of-similarity calculation unit, and the search is performed on the basis of the calculated degree of similarity. Accordingly, in this aspect, it is possible to perform search for the similar damage according to the degree of similarity.

Preferably, the similar damage search device further comprises: a degree-of-similarity calculation unit that calculates an individual degree of similarity for each of a plurality of search target damages in a case where there are the plurality of search target damages in the damage image of the search target; and a representative value determination unit that determines a representative value among the individual degrees of similarity calculated by the degree-of-similarity calculation unit, wherein the search unit searches the database for one or a plurality of pieces of first damage information on the basis of the representative value determined by the representative value determination unit.

According to this aspect, the individual degree of similarity is calculated for each of the plurality of search target damages by the degree-of-similarity calculation unit, the representative value is determined among the individual degrees of similarity by the representative value determination unit, and the search is performed on the basis of the determined representative value. Accordingly, in this aspect, it is possible to perform accurate search even in a case where there are a plurality of damages in the damage image.

Preferably, the information on the hierarchical structure of the damage vector includes at least information on the damage vector that becomes a trunk through branching or information on the damage vector that becomes a branch through branching.

According to this aspect, the information on the hierarchical structure of the damage vector includes at least information on the damage vector that becomes a trunk through branching or information on the damage vector that becomes a branch through branching. Accordingly, in this aspect, it is possible to perform accurate search for damage having a structure branched using a branch as a start point.

Preferably, the similar damage search device further comprises a list data generation unit that generates list data in which search results of the search unit are sorted according to the degree of similarity.

According to this aspect, it is possible to obtain the list in which search results are sorted according to the degree of similarity.

Preferably, the database stores information on a structure having the damage in association with the first damage information, and the search unit searches for information on the structure stored in the database on the basis of search results of one or a plurality of pieces of first damage information similar to the second damage information.

According to this aspect, since the information on the structure having damage is stored in the database, it is possible to acquire information on a structure having similar damage.

Preferably, the database stores a repair record of the damage in association with the first damage information, and the search unit searches for the repair record stored in the database on the basis of search results of one or a plurality of pieces of first damage information similar to the second damage information.

According to this aspect, since the repair record of the damage is stored in the database, it is possible to acquire information on the repair record of the similar damage.

A similar damage search method according to another aspect of the present invention comprises the steps of: storing first damage information generated on the basis of a damage image of a structure in a database, the first damage information including a damage vector obtained by vectorizing damage of the structure, and damage structure information including at least one of information on a hierarchical structure of the damage vector or information on a direction of the damage vector; acquiring second damage information corresponding to the first damage information on the basis of a damage image of a search target; and searching for one or a plurality of pieces of first damage information similar to the second damage information from among the first damage information stored in the database on the basis of the second damage information.

According to the present invention, since the search for the similar damage is performed on the basis of the damage vector obtained by vectorizing damage of the structure, and the damage structure information including at least one of the information on the hierarchical structure of the damage vector or the information on the direction of the damage vector, it is possible to perform accurate search for the similar damage in which features of damage are recognized.

BRIEF DESCRIPTION OF THE DRAWINGS

FIG. 11 is a diagram illustrating an example of damage vector information included in hierarchical structure information (corresponding to Example 1 of a hierarchy determination scheme).

FIG. 14 is a table showing an example of hierarchical structure information corresponding to Example 2 of the hierarchy determination scheme.

FIG. 18 is a table showing an example of hierarchical structure information corresponding to Example 3 of the hierarchy determination scheme.

FIG. 20 is a table showing an example of hierarchical structure information corresponding to Example 4 of the hierarchy determination scheme.

FIG. 22 is a table showing an example of the information on the direction of the damage vector.

FIG. 23 is a table showing image information included in hierarchical structure information.

FIG. 28 is a block diagram of a similar damage search device.

DESCRIPTION OF THE PREFERRED EMBODIMENTS

Hereinafter, preferred embodiments of the present invention will be described with reference to the accompanying drawings.

Figure 1:
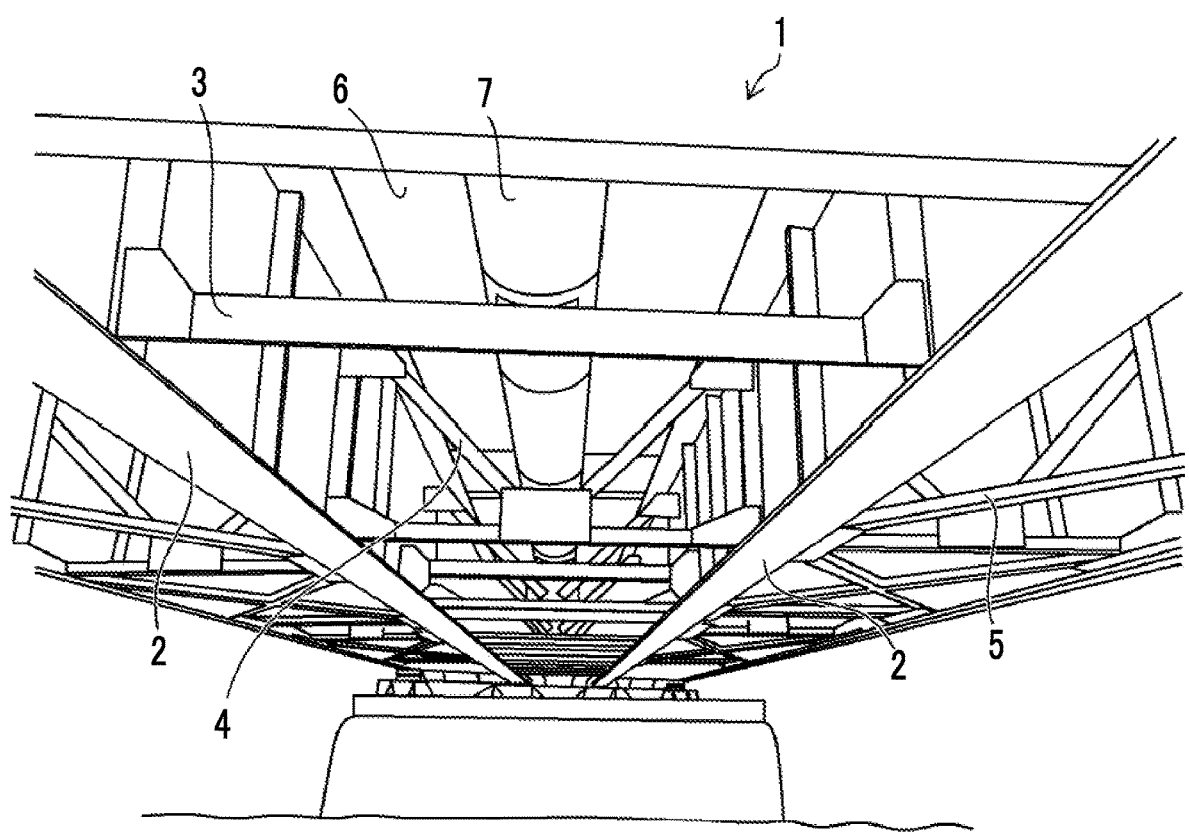
FIG. 1 is a perspective view illustrating a structure of a bridge.

FIG. 1 is a perspective view illustrating a structure of a bridge 1 which is an example of a structure and is a view of the bridge 1 as viewed from below. It should be noted that other examples of the structure are a road, a building, a pillar, and a tunnel. In the present invention, damage to the structure is imaged by a camera, and information accumulated as past information or sample information is searched for on the basis of information extracted from a captured image (a damage image). Here, the damage refers to a crack, a free lime, or a missing part.

The bridge 1 illustrated in FIG. 1 includes a main girder 2, a transverse girder 3, a sway bracing 4, and a lateral bracing 5, which are connected by bolts, rivets, or welding. Also, a deck 6 on which a vehicle or the like travels is installed on an upper part of the main girder 2, or the like. The deck 6 is generally made of rebar concrete.

The main girder 2 is a member that is passed between abutments or piers and supports a load of vehicles or the like on a deck 6. The transverse girder 3 is a member that connects a plurality of main girders 2 in order to support the load with the main girders 2. The sway bracing 4 and the lateral bracing 5 are members which connect the main girders 2 to each other in order to resist a lateral load such as wind or earthquake. Further, a pipe 7 is laid in a lower part of the bridge 1.

Figure 2:
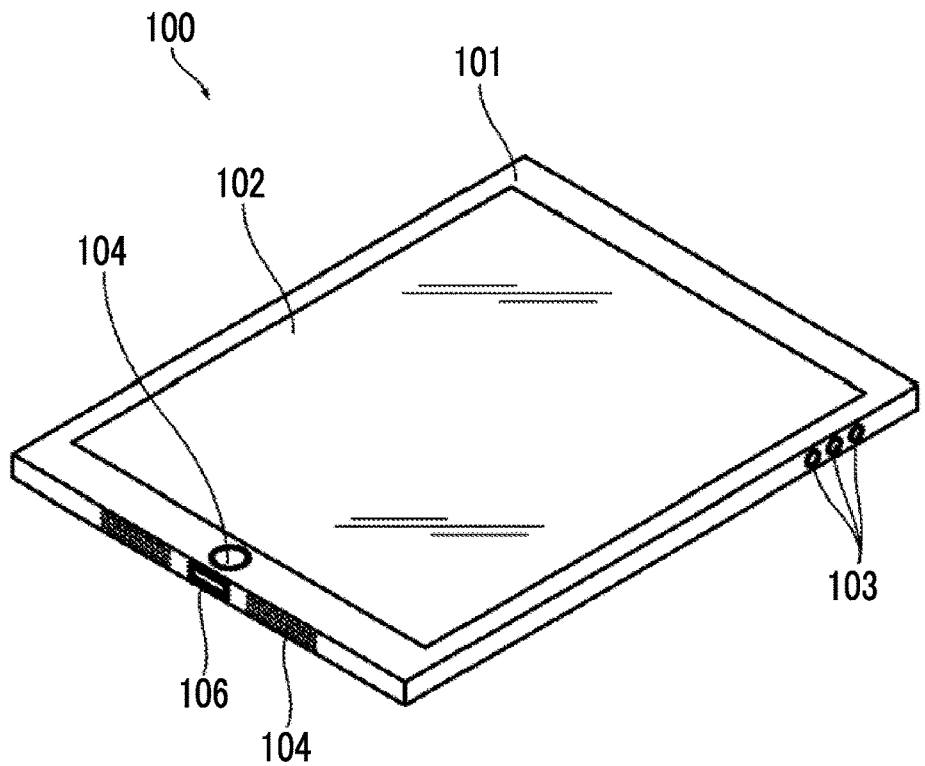
FIG. 2 is a perspective view illustrating an appearance configuration of a computer.
Figure 3:
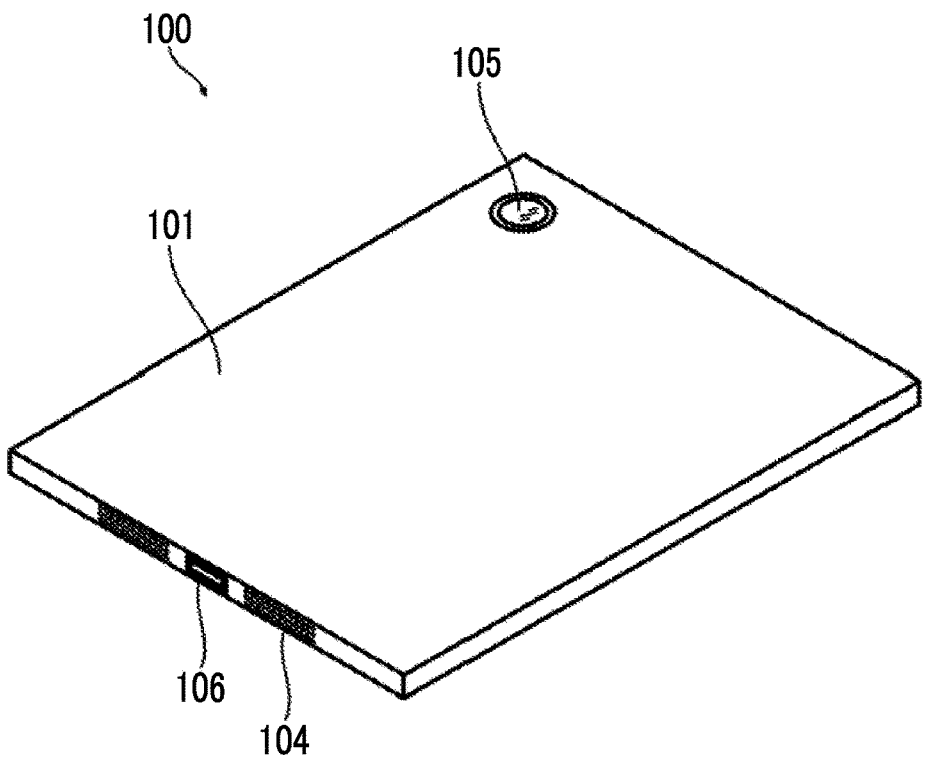
FIG. 3 is a perspective view illustrating an appearance configuration of the computer.

FIGS. 2 and 3 are perspective views illustrating an external configuration of the computer 100 constituting the similar damage search device. FIG. 2 is a front perspective view, and FIG. 3 is a rear perspective view.

As illustrated in FIGS. 2 and 3, the computer 100 is constituted by a tablet computer. The computer 100 includes a flat casing 101 having a rectangular outline, and includes, for example, a touch panel display 102 serving as both a display unit 126 and an input unit 128, an operation button 103, a speaker 104, a built-in camera 105, and an external connection terminal 106.

Figure 4:
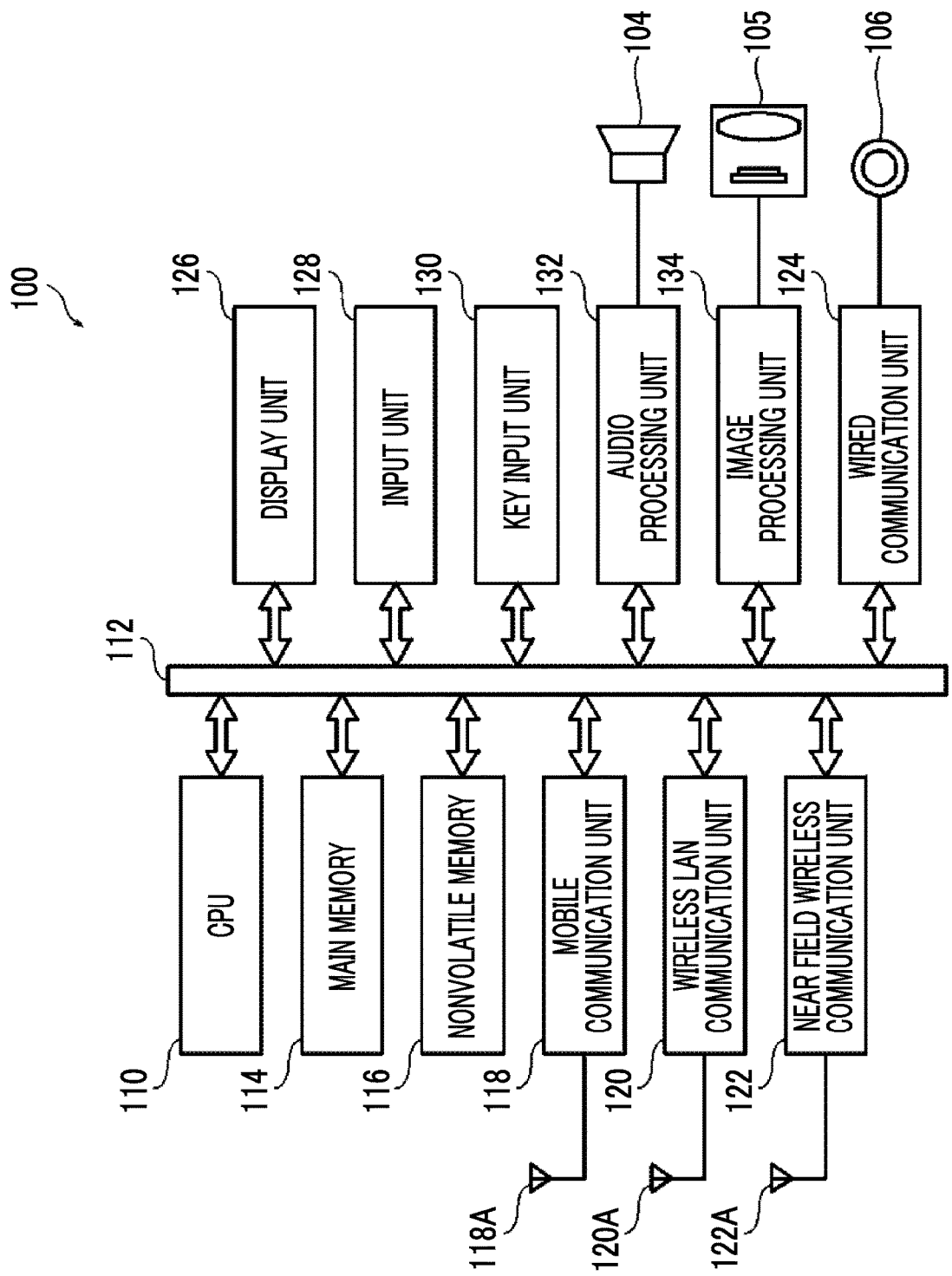
FIG. 4 is a block diagram illustrating a system configuration of the computer.

FIG. 4 is a block diagram illustrating a system configuration of the computer 100.

As illustrated in FIG. 4, the computer 100 includes a central processing unit (CPU) 110 that controls an overall operation of the computer 100, and is configured such that a main memory 114, a nonvolatile memory 116, a mobile communication unit 118, a wireless local area network (LAN) communication unit 120, a near field wireless communication unit 122, a wired communication unit 124, a display unit 126, an input unit 128, a key input unit 130, an audio processing unit 132, an image processing unit 134, and the like are connected to the CPU 110 via a system bus 112 in the casing 101.

The CPU 110 functions as a control unit that reads out an operation program (an operating system (OS) and an application program operating on the OS), fixed-form data, and the like stored in the nonvolatile memory 116, develops the operation program in the main memory 114, and executes the operation program to control an operation of the entire computer.

The main memory 114 includes, for example, a random access memory (RAM) and functions as a work memory of the CPU 110.

The nonvolatile memory 116 is constituted by, for example, a flash EEPROM (EEPROM: Electrically Erasable Programmable Read Only Memory) and stores the above-described operation program or various types of fixed-form data. Further, the nonvolatile memory 116 functions as a storage unit of the computer 100 and stores various types of data.

The mobile communication unit 118 executes data transmission or reception to or from the nearest base station (not illustrated) via an antenna 118A on the basis of a third generation mobile communication system conforming to the International Mobile Telecommunication-2000 (IMT-2000) standard and a fourth generation mobile communication system conforming to the International Mobile Telecommunications-Advanced (IMT-Advanced) standard.

The wireless LAN communication unit 120 performs wireless LAN communication according to a predetermined wireless LAN communication standard (for example, the IEEE 802.11a/b/g/n standard) with a wireless LAN access point or an external device capable of wireless LAN communication, via the antenna 120A.

The near field wireless communication unit 122 executes transmission or reception of data to or from another device conforming to the Bluetooth (registered trademark) standard which is, for example, within a range of class 2 (within a radius of about 10 m) via the antenna 122A.

The wired communication unit 124 performs communication according to a predetermined communication standard with an external device connected using a cable via the external connection terminal 106.

The display unit 126 includes a color liquid crystal display (LCD) panel constituting a display portion of the touch panel display 102, and a driving circuit thereof, and displays various images.

The input unit 128 constitutes a touch panel portion of the touch panel display 102. The input unit 128 is configured integrally with the color LCD panel using transparent electrodes. The input unit 128 generates and outputs two-dimensional position coordinate information corresponding to a touch operation of a user.

The key input unit 130 includes a plurality of operation buttons 103 included in the casing 101 of the computer 100, and a driving circuit thereof.

The audio processing unit 132 converts digital audio data provided via a system bus 112 into analog audio data and outputs the analog audio data from the speaker 104.

The image processing unit 134 digitizes an analog image signal output from the built-in camera 105 including an imaging lens and an image sensor, performs required signal processing on a digital image signal, and outputs the digital image signal.

First Embodiment

Next, a first embodiment of the similar damage search (a similar damage search device and a similar damage search method) that is realized by the computer 100 will be described.

Figure 5:
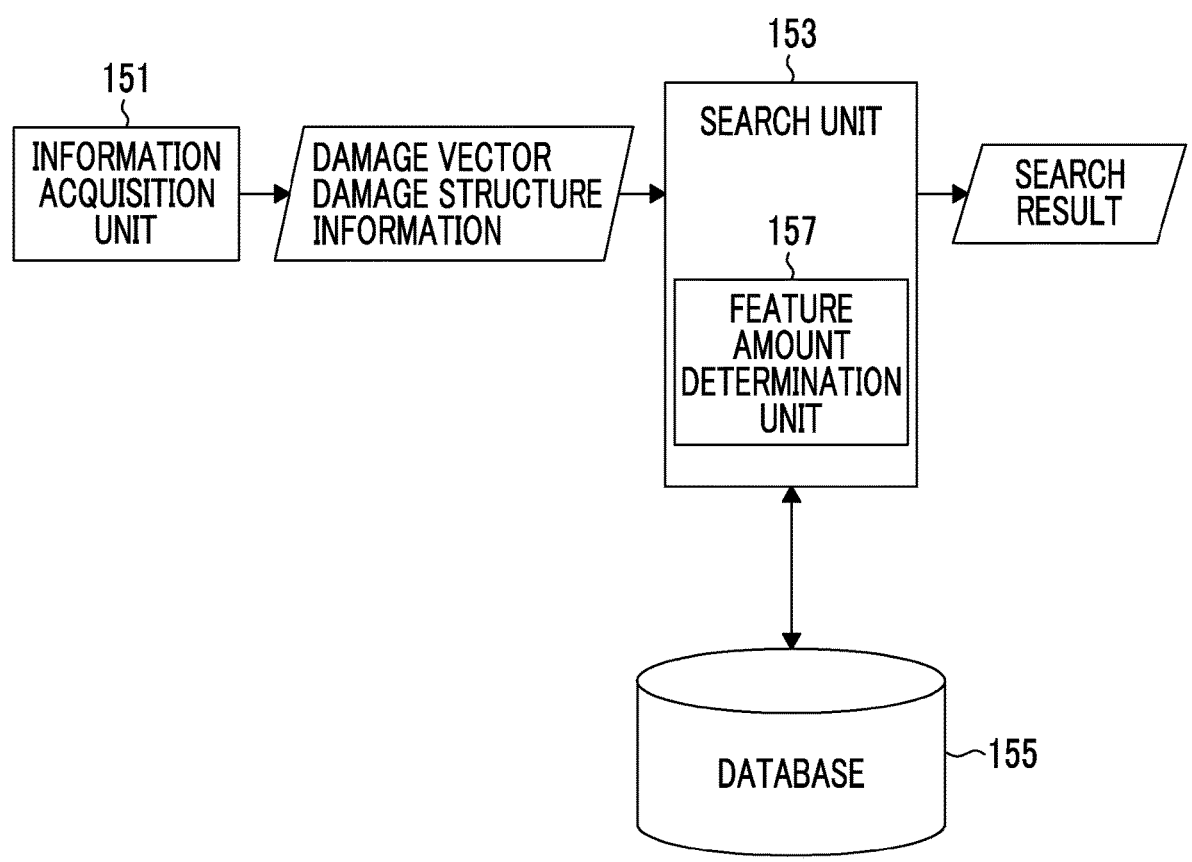
FIG. 5 is a block diagram of a similar damage search device.

FIG. 5 is a block diagram of a similar damage search device that is realized in the computer 100. The similar damage search device mainly includes an information acquisition unit 151, a search unit 153, and a database 155.

The information acquisition unit 151 acquires search target information (second damage information) corresponding to information (accumulated information: first damage information) stored in the database 155 on the basis of the captured image (damage image) obtained by imaging damage that is a search target. That is, in order to search for the accumulated information stored in the database 155, the information acquisition unit 151 acquires the search target information corresponding to the accumulated information. Here, acquiring the search target information (the second damage information) corresponding to the accumulated information is to acquire, as the search target information, the same type of information as the information stored as the accumulated information. For example, in a case in which a damage vector (a start point, a termination point, and a length) and data (a parent vector ID, a sibling vector, and a child vector) regarding a hierarchical structure of the damage vector are stored as the first damage information in the database 155, the information acquisition unit 151 acquires the damage vector (the start point, the termination point, and the length) and the data (the parent vector ID, the sibling vector, and the child vector) regarding the hierarchical structure of the damage vector as the second damage information. It should be noted that the information acquisition unit 151 may acquire search target information by processing the damage image captured in the computer 100 using the image processing unit 134 or may acquire search target information processed and extracted in an image processing device separated from the similar damage search device.

On the basis of the search target information acquired by the information acquisition unit 151, the search unit 153 searches for one or a plurality of pieces of accumulated information similar to the search target information from among the accumulated information stored in the database 155. The search unit 153 can search for the accumulated data similar to the search target data using a known method. For example, the search unit 153 extracts accumulated data having a feature amount that is the same as or most similar to a feature amount of the search target data, and outputs the accumulated data as a search result. The feature amount will be described below.

The search unit 153 may be provided with a feature amount determination unit 157. In a case where the search target data includes a plurality of feature amounts, the feature amount determination unit 157 determines the feature amount to be used for search and performs the search on the basis of the determined feature amount. Specifically, the feature amount determination unit 157 determines the feature amount to be used for search, including at least a feature amount of a damage vector. That is, as described below, each of the damage vector, information on a hierarchical structure of the damage vector, information on a direction of the damage vector includes one or a plurality of feature amounts. Therefore, the feature amount determination unit 157 determines one or a plurality of feature amounts to be used for the search, and the search unit 153 outputs the search result. The determination of the feature amount to be used for search, which is performed by the feature amount determination unit 157, may be automatically performed via the CPU 110 or may be performed manually by the user inputting a command.

At least the damage vector and the damage structure information are stored in the database 155 as the accumulated information. The damage vector is generated on the basis of the damage image and is obtained by vectorizing the damage of the structure. Further, the damage structure information is information including at least one of the information on the hierarchical structure of the damage vector or the information on the direction of the damage vector.

Next, the information stored in the database 155 of the present invention will be described. Information on damage as past damage or a sample is stored as accumulated information in the database 155 of the present invention. The accumulated information includes damage structure information including at least one of a damage vector obtained by vectorizing the damage of the structure, the information on the hierarchical structure of the damage vector, or the information on the direction of the damage vector.

The damage vector is generated on the basis of the damage image obtained by imaging the damage of the structure. For example, detection of the cracks from the damage image is performed using a known method, and the damage vector is generated on the basis of the detected cracks.

As a method of detecting the cracks from the damage image, for example, a crack detection method described in Japanese Patent No. 4006007 can be used. This method is a crack detection method including a step of calculating wavelet coefficients corresponding to two densities to be compared, calculating respective wavelet coefficients in a case where the two densities are changed to create a wavelet coefficient table, and creating a wavelet image by performing wavelet-transformation on an input image obtained by imaging a concrete surface that is a crack detection target, and a step of setting wavelet coefficients corresponding to an average density of neighboring pixels in a local region and a density of pixels of interest in the wavelet coefficient table, as a threshold value, and comparing the wavelet coefficient of the pixel of interest with the threshold value to determine a crack region and a non-crack region.

Figure 6:
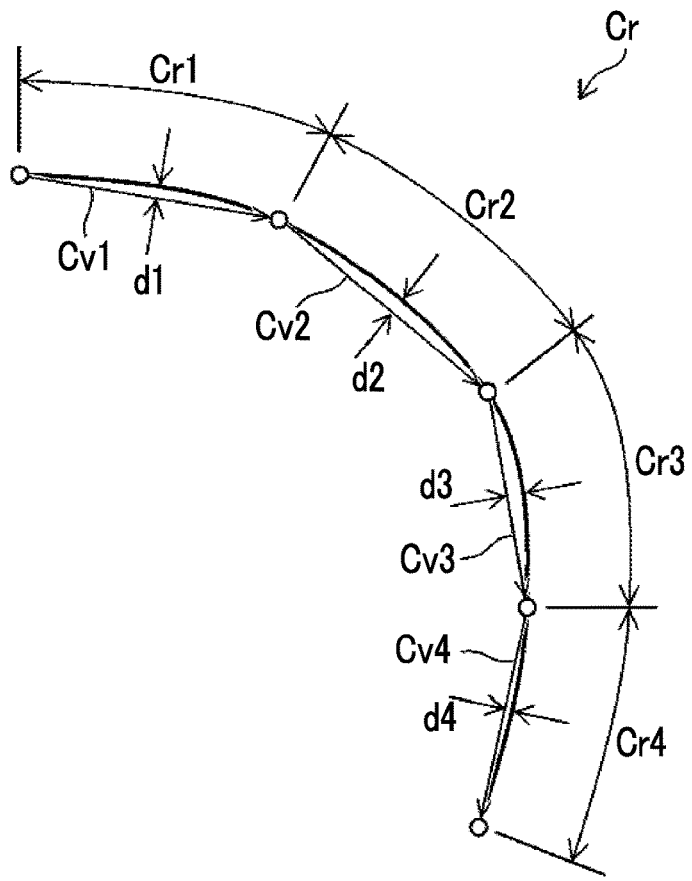
FIG. 6 is a diagram illustrating a state in which a plurality of damage vectors are generated by dividing a curved damage.

A damage vector (a crack vector) is generated on the basis of the detected damage (cracks). The damage vector is a line segment that is determined by a start point and a termination point, and in a case where the damage (cracks) is curved, the damage is divided into a plurality of sections so that a distance between a curve and a line segment is equal to or smaller than a threshold value, and a crack vector is generated for each of the plurality of sections. In the example of FIG. 6, the curved crack Cr is divided into four sections Cr1 to Cr4, and crack vectors Cv1 to Cv4 are generated for the respective sections, so that distances d1 to d4 between the cracks and the crack vectors Cv1 to Cv4 in the sections Cr1 to Cr4 are equal to or smaller than the threshold value.

Figure 7:
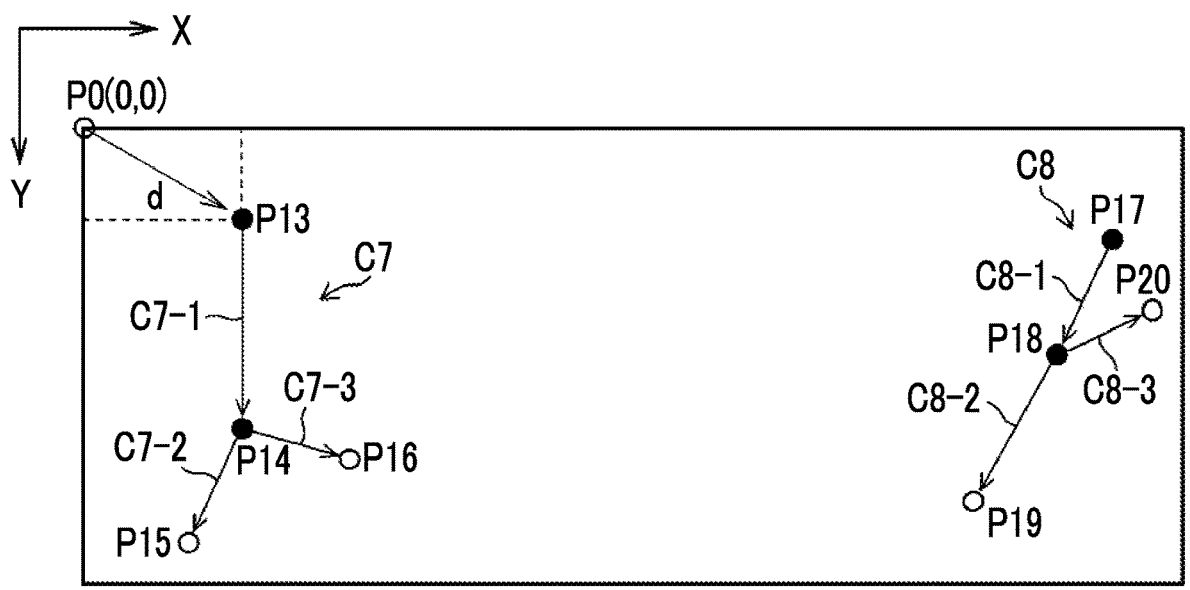
FIG. 7 is a diagram illustrating a state in which a start point of a damage vector is determined.

When the damage vector is generated, for example, a feature point of the deck 6 is set as an origin of a coordinate system, an end point at which a distance from the origin is minimized is set to a first start point for the group of damage vectors (vector group), and then, a start point and a termination point can be sequentially determined in a traveling direction of the damage vector. In the example of FIG. 7, in a case where a point P0 on the deck 6 is the origin of the coordinate system, and a downward direction and a right direction in FIG. 7 are an X-axis direction and a Y-axis direction of the coordinate system, a points P13 at which the distance d from the point P0 is the shortest among points P13, P14, P15, and P16 of the vector group C7 can be set as a start point of a damage vector C7-1, the point P14 can be set as a termination point of the damage vector C7-1 (and a start point of the damage vectors C7-2 and C7-3), and then, the points P15 and P16 can be set as a termination point of the damage vectors C7-2 and C7-3.

Figure 8:
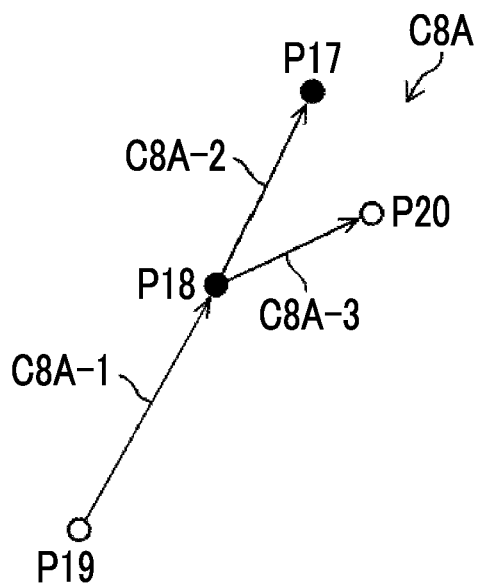
FIG. 8 is another diagram illustrating the state in which a start point of a damage vector is determined.

However, in a case where a start point of a vector group C8 is determined using the same scheme, a point P17 is a start point of a damage vector C8-1, a point P18 is a start point of damage vectors C8-2 and C8-3, and a traveling direction of the damage vector C8-3 (a direction from the point P18 to the point P20) is opposite to a traveling direction of the damage vector C8-1. Therefore, in such a case, as illustrated in FIG. 8, a point P19 may be set as a start point of a damage vector C8A-1, a point P18 may be set as a termination point of the damage vector C8A-1 (and a start point of damage vectors C8A-2 and C8A-3), and points P17 and P20 may be set as termination points of the damage vectors C8A-2 and C8A-3, respectively. It should be noted that a set of damage vectors in this case is indicated as a vector group C8A.

In a case where the damage vector is generated as described above, when the damage is continuous within the deck 6, but separated on the surface, the damage vector is likely to be recognized as a separate damage vector. In such a case, one or a plurality of vectors may be generated by connecting such a plurality of damage vectors.

Figure 9:
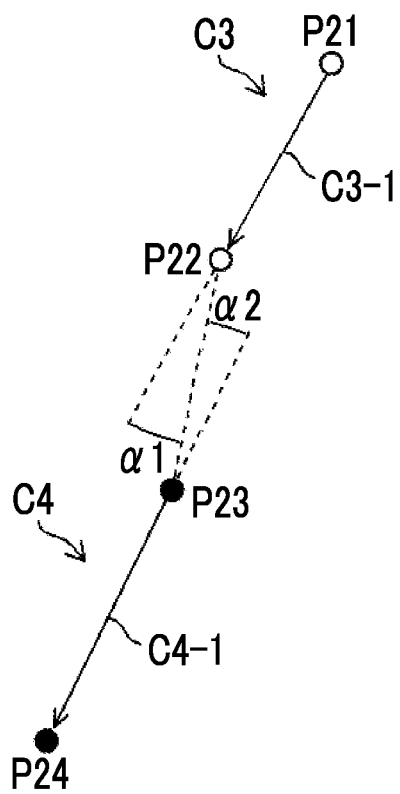
FIG. 9 is a diagram illustrating a connection of separated damage vectors.
Figure 10:
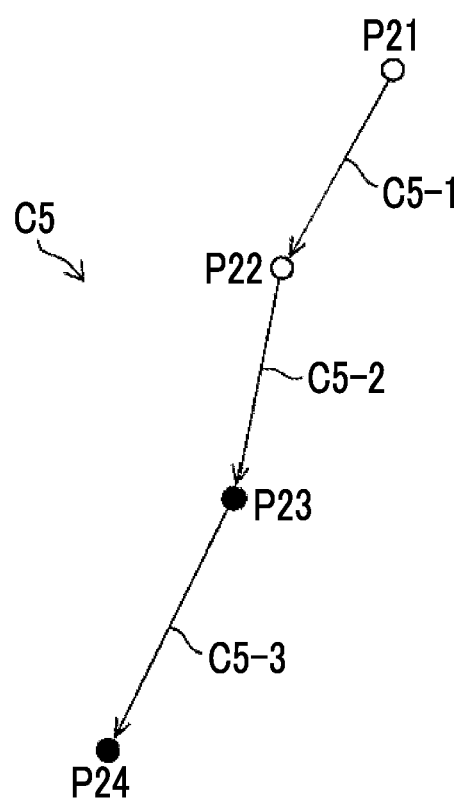
FIG. 10 is another diagram illustrating the connection of separated damage vectors.

FIG. 9 is a diagram illustrating an example of connection of damage vectors and illustrates a situation in which a vector group C3 including a damage vector C3-1 (a point P21 and a point P22 are a start point and a termination point, respectively) and a vector group C4 including a damage vector C4-1 (a point P23 and a point P24 are a start point and a termination point, respectively) have been extracted. Further, an angle formed between the damage vector C3-1 and a line segment connecting the points P22 and P23 is $\alpha 1$, and an angle between the damage vector C4-1 and the line segment connecting the points P22 and P23 is $\alpha 2$. In this case, in a case where both the angle $\alpha 1$ and the angle $\alpha 2$ are equal to or smaller than a threshold value $\alpha 0$, the damage vectors C3-1 and C4-1 are connected to each other and the vector groups C3 and C4 are merged. Specifically, as illustrated in FIG. 10, a new damage vector C5-2 is generated and connected to other damage vectors C5-1 (which is the same as the damage vector C3-1) and C5-3 (which is the same as the damage vector C4-1), and a new vector group including the damage vectors C5-1, C5-2, and C5-3 is set as a vector group C5.

It should be noted that the above-described scheme is an example of a damage vector connection scheme, and other methods may be used. Further, the determination may be made as to whether or not to connect the damage vectors as described above is performed manually or automatically.

FIG. 11 is a diagram illustrating a configuration example of accumulated information stored in the database 155. The accumulated information stored in the database 155 includes information on a vector group to which the damage vector belongs, unique information of each damage vector, information on another damage vector connected to each damage vector in the vector group, and additional information. That is, the accumulated information includes a damage vector and damage structure information, and the damage structure information includes information on the hierarchical structure of the damage vector and information on the direction of the damage vector. It should be noted that in the example illustrated in FIG. 11, the information on the damage vector is information on a vector group identification (ID), a vector ID, a start point, a termination point, a length, and a width, and the information on the hierarchical structure of the damage vector is a hierarchy (level), a parent vector ID, a sibling vector ID, and a child vector ID.

Here, for the hierarchy (level), level 1 is the highest level, and the hierarchy is a lower level as the number increases. Details of a specific hierarchy determination method will be described below.

The information on the hierarchical structure of the damage vector is information in which the damage vectors are classified according to the hierarchy. For example, in a case where a termination point of one damage vector is a start point of another damage vector, the one damage vector is referred to as "a parent vector", and the other damage vector is referred to as a "child vector". It is assumed that the number of parent vectors is determined to be zero or one for one damage vector, but there may be any number of child vectors equal to or greater than zero for one parent vector. Also, in a case where the termination point of the parent vector is a start point of a plurality of child vectors, the plurality of child vectors are referred to as "sibling vectors" from each other. There may be any number of sibling vectors equal to or greater than zero.

Thus, identification information (IDs) of the parent vector, the sibling vector, and the child vector are included in the hierarchical structure information, and therefore, the parent vector, the sibling vectors, and the child vectors can be sequentially specified by referring to the IDs of the vectors on the basis of any damage vector. For example, it is possible to specify a parent vector of a certain damage vector and further specify a parent vector of that parent vector.

Further, the accumulated information includes additional information, and the additional information includes a deletion operation flag, an addition operation flag, an inspection date, and a repair record. The "width" included in the additional information indicates the width of the cracks corresponding to each damage vector. The deletion operation flag indicates whether or not the vector is a vector on which a deletion operation has been performed, and is "1" in a case where the deletion operation has been performed and "0" in a case where the deletion operation has not been performed. By referring to this deletion operation flag, it is possible to switch between display and non-display of the damage vector. The addition operation flag is related to a detection aspect of the damage vector, and is "0" in a case when the vector is an automatically detected vector, "1" in a case where the vector is a vector added manually (by an instruction input from the user), and"2" in a case where the vector is a vector added manually and generated by connecting vectors of different IDs.

A date on which the damage image has been captured is set in "Inspection date", but the date can be edited by an instruction input from the user. Further, recording of "Repair" can be generated on the basis of the instruction input (a type of repair and a repair date) from the user. Examples of the type of repair include filling with cement, filling with resin, and leaving (follow-up observation) (described as R1, R2, and R3 respectively in the table of FIG. 11).

Next, a hierarchy (level) to which the damage vector belongs will be described. The hierarchy of the damage vector can be determined using various schemes, for example, as described in Examples 1 to 4 below.

Hierarchy Determination Scheme (Example 1)

Figure 12:
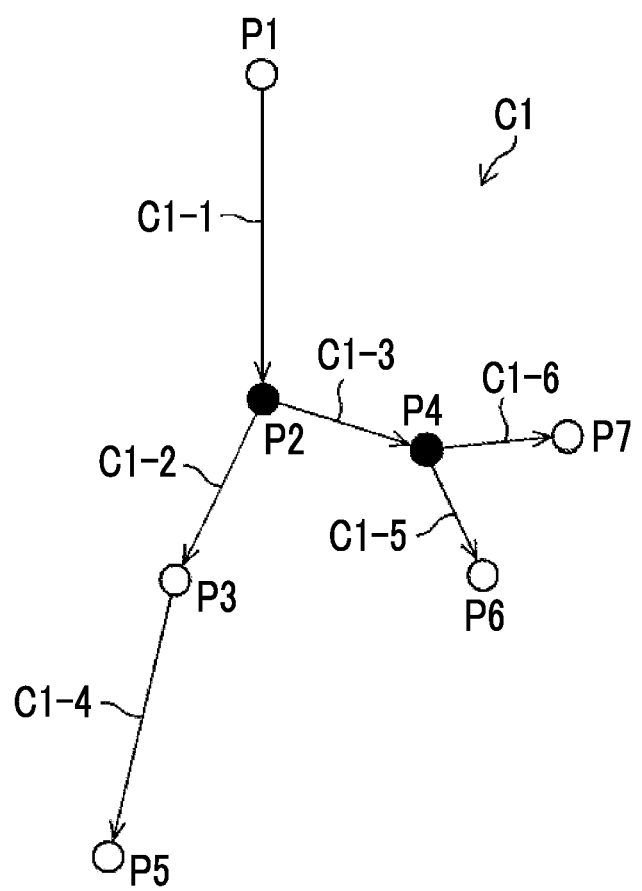
FIG. 12 is a diagram illustrating Example 1 of the hierarchy determination scheme for a damage vector.

FIG. 12 is a diagram illustrating the vector group C1. The vector group C1 includes damage vectors C1-1 to C1-6, and the damage vectors have points P1 to P7 as start points or termination points. Under such a situation, in Example 1, it is assumed that the hierarchy becomes lower each time the damage vector branches (a termination point of a certain damage vector is a start point of the plurality of other damage vectors). Specifically, the hierarchy of the damage vector C1-1 is set as the highest "level 1", and a hierarchy of damage vectors C1-2 and C1-3 in which the point P2 serving as the termination point of the damage vector C1-1 is set as the start point is set to be at "level 2" which is lower than the damage vector C1-1. Similarly, a hierarchy of the damage vectors C1-5 and C1-6 in which point P4 which is the termination point of the damage vector C1-3 is set as a start point is set to be at "level 3" which is lower than the damage vector C1-3. On the other hand, since the point P3 which is the termination point of the damage vector C1-2 is set as the start point of the damage vector C1-4, but the damage vector in which the point P3 is the start point is only the damage vector C1-4 and there is no branch, the hierarchy of the damage vector C1-4 is set to be at "level 2" that is the same as that of C1-2. The hierarchy of each damage vector determined in this way is included in the hierarchical structure information as shown in the table of FIG. 11.

Hierarchy Determination Scheme (Example 2)

Figure 13:
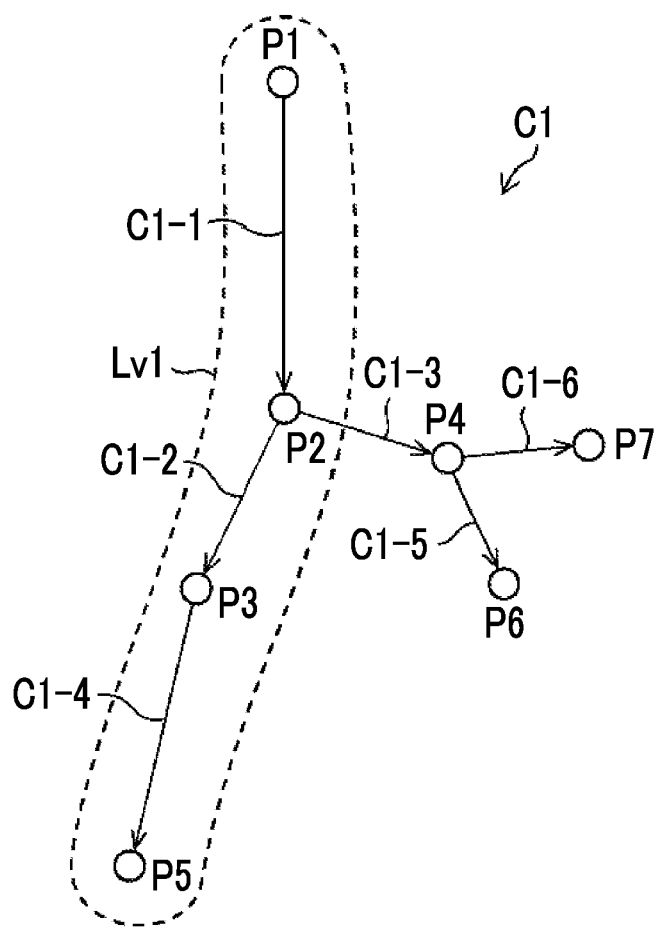
FIG. 13 is another diagram illustrating Example 2 of the hierarchy determination scheme for a damage vector.

FIG. 13 is a diagram illustrating a vector group C1 (a connection relationship between damage vectors is the same as that illustrated in FIG. 12). In Example 2, it is assumed that one of the damage vectors to be connected of which an angle formed with respect to another damage vector is equal to or smaller than the threshold value (a damage vector corresponding to a "trunk" through branching in a tree structure) belong to the same hierarchy. Specifically, damage vectors C1-1, C1-2, and C1-4 present within a dotted line (a range indicated by a reference symbol Lv1) in FIG. 13 are set to "level 1" (the highest level) which is the same hierarchy. Further, for other damage vectors C1-3, C1-5, and C1-6, the hierarchy becomes lowered each time the damage vector branches as in Example 1, the damage vector C1-3 (corresponding to a "branch" through branching in the tree structure) is set to a "level 2", and the damage vectors C1-5 and C1-6 (corresponding to "leaves" through branching in the tree structure) are set to "level 3". The hierarchy and the type (a trunk, a branch, or a leaf) of each damage vector determined in this way are included in the hierarchical structure information as shown in the table of FIG. 14.

Hierarchy Determination Scheme (Modification Example of Example 2)

A modification example of the above-described hierarchy determination scheme (example 2) will be described. As in the hierarchy determination scheme (Example 2), in a case where the hierarchy is determined on the assumption that the damage vector corresponds to a trunk, a branch, and a leaf in a tree structure, it is generally considered that the "branch" is shorter than the "trunk", and therefore, the hierarchy may be determined by setting the longest damage vector as a "truck" (level 1) and other damage vectors as "branches" or "leaves". In this case, for example, in the damage vector information shown in the table of FIG. 14, the damage vector C1-1 having a length of 100 mm becomes "trunk" (level 1). The damage vectors C1-2 and C1-3 can be set as "branches" (level 2), the damage vectors C1-4 can be set as "branches" (level 2) or "leaves" (level 3), and the damage vectors C1-5 and 6 can be set as "leaves" (level 3).

It should be noted that the damage vector constituting "longest cracks" rather than the "longest damage vector" may be set as a "trunk" (level 1), and the damage vectors corresponding to the cracks branching from the "trunk" may be set as "branches" or "leaves". In this case, the "longest crack" is assumed to mean that "when a thick crack and a thin crack are both connected, the crack is longest".

Also, a type (a trunk, a branch, and a leaf) and a hierarchy may be determined in consideration of a width (a width of the damage corresponding to the damage vector) in addition to a length of the damage vector. For example, the hierarchy may be determined by setting the damage vector of which "length×width" is maximized as a "trunk" and setting the other damage vector as a "branch" or a "leaf". In this case, for example, in the damage vector information shown in the table of FIG. 14, the damage vector C1-1 with "length× width" being the maximum (100 mm$^2$) is "trunk". The damage vectors C1-2 and C1-3 can be set as "branches" (level 2), damage vector C1-4 can be set as a "branch" (level 2), or a "leave" (level 3), and the damage vectors C1-5 and 6 can be set as "Leaves" (level 3).

It is possible to improve accuracy of hierarchization by determining the hierarchy of the damage vector in consideration of the length of the damage vector or "length× width", as in the above-described modification example.

Hierarchy Determination Scheme (Example 3)

Figure 15:
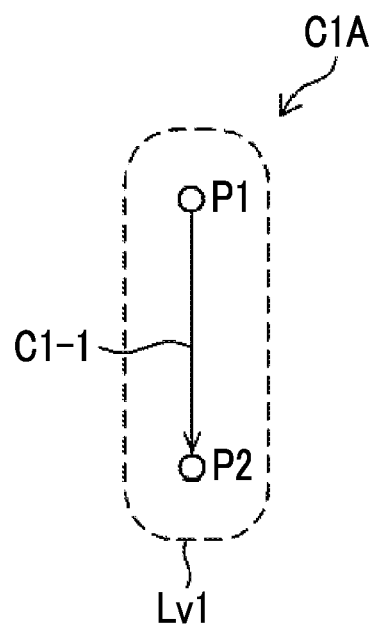
FIG. 15 is a diagram illustrating Example 3 of the hierarchy determination scheme for a damage vector.
Figure 16:
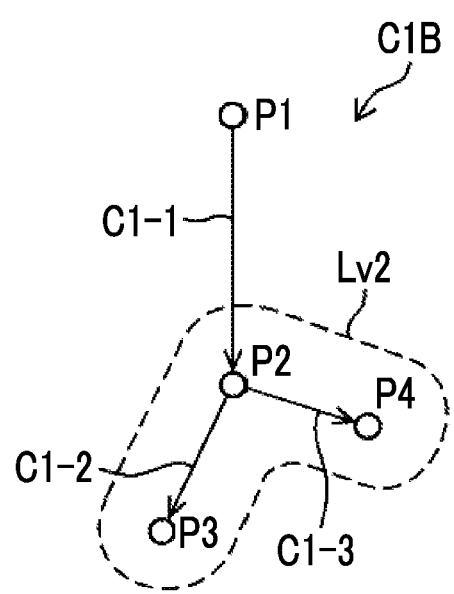
FIG. 16 is another diagram illustrating Example 3 of the hierarchy determination scheme for a damage vector.
Figure 17:
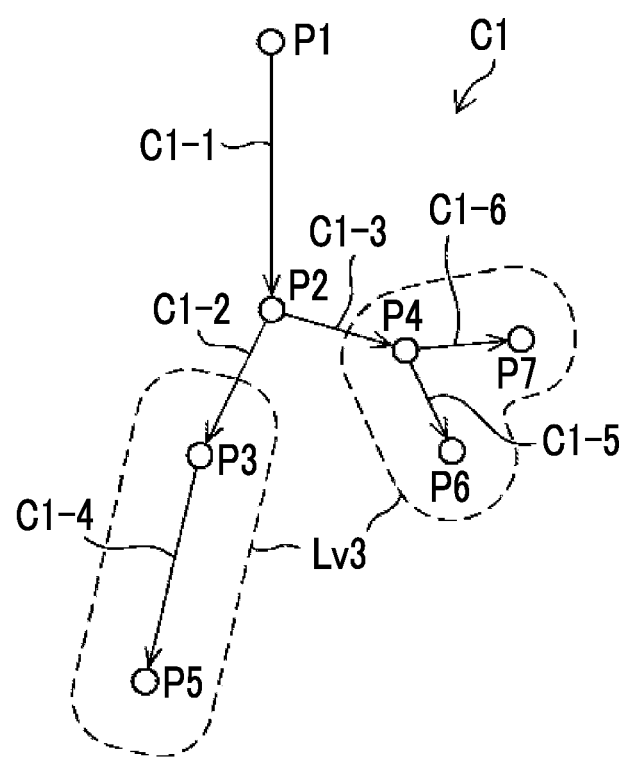
FIG. 17 is another diagram illustrating Example 3 of the hierarchy determination scheme for a damage vector.

FIGS. 15 to 17 are diagrams illustrating the vector group C1 (a connection relationship between damage vectors is the same as those illustrated in FIGS. 12 and 13). In Example 3, a time before and after occurrence of the damage vector is determined on the basis of the imaging date and time for the image of the bridge 1, and as the damage vector occurs later in time, the damage vector belongs to the lower hierarchy. In the case of FIGS. 15 to 17, the vector group CIA including the damage vector C1-1 is generated in the first captured image (FIG. 15), the damage vectors C1-2 and C1-3 are newly generated and form a vector group C1B in the next captured image (FIG. 16), and damage vectors C1-4, C1-5, and C1-6 are further generated and form the vector group C1 in the last captured image (FIG. 17).

In such a situation, in Example 3, the damage vector C1-1 (a range indicated by a reference numeral Lv1 in FIG. 15) occurring in the first image is at the highest "level 1", the damage vectors C1-2 and C1-3 occurring in the next image (a range indicated by a reference symbol Lv2 in FIG. 16) are at "level 2", and the damage vectors C1-4, C1-5, and C1-6 occurring in the last image (a range indicated by a reference symbol Lv3 in FIG. 17) is at "level 3".

The hierarchy of each damage vector determined in this way is included in the hierarchical structure information as shown in the table of FIG. 18.

Hierarchy Determination Scheme (Example 4)

Figure 19:
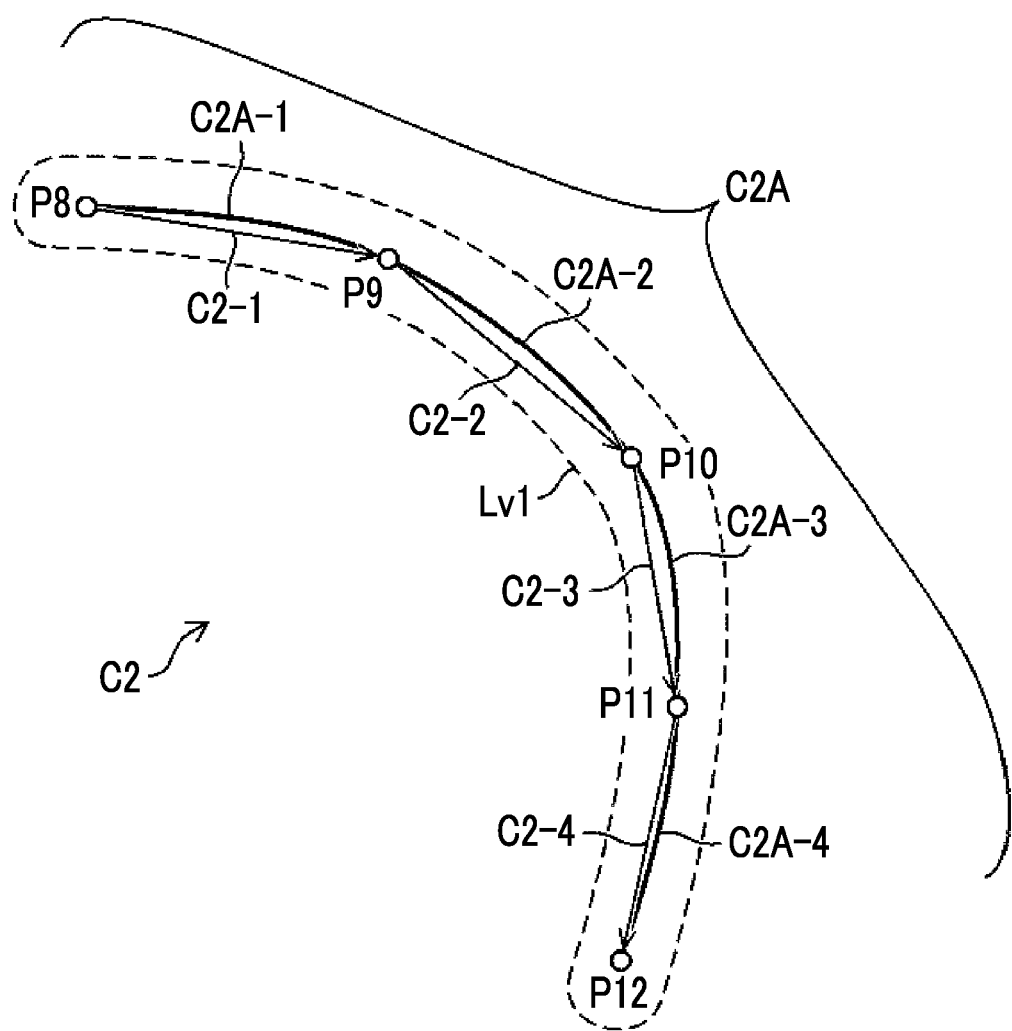
FIG. 19 is a diagram illustrating Example 4 of the hierarchy determination scheme for a damage vector.

FIG. 19 is a diagram illustrating a crack C2A and a corresponding vector group C2. In Example 4, in a case where there is only another damage vector connected to one damage vector, it is assumed that such other damage vector belongs to the same hierarchy as the one damage vector. Specifically, a case where one curved crack C2A is divided into a plurality of cracks C2A-1 to C2A-4, and the cracks correspond to damage vectors C2-1 to C2-4 having points P8 to P12 as start points or termination points, respectively, as illustrated in FIG. 19, is considered, only one damage vector (damage vectors C2-2 to C2-4) is connected to a termination point of the damage vectors C2-1 to C2-3. In such a case, in Example 4, the damage vectors C2-1 to C2-4 (a range indicated by reference symbol Lv1 in FIG. 19) are considered to be substantially one damage vector and are all assumed to belong to "level 1" (the highest level) that is the same hierarchy. The hierarchy of each damage vector determined in this way is included in the hierarchical structure information as shown in the table of FIG. 20.

Although Examples 1 to 4 of the affiliation hierarchy determination scheme of the damage vector have been described above, the schemes can be appropriately used according to a specific aspect of damage and a plurality of schemes may be used in combination, as necessary. For example, for a group of damage vectors having a complex connection pattern, the hierarchy may be determined for a certain part using Example 1, and the hierarchy may be determined for another part using Example 4.

Next, information on the direction of the damage vector will be described.

The database 155 has information on the direction of the damage vector as the damage structure information. Here, the information on the direction of the damage vector is information on the direction of the damage vector for the structure. For example, the information on the direction of the damage vector is information indicating whether the crack is a crack extending in parallel to or a crack extending vertically to a traveling direction of a vehicle in the deck 6. For example, the information on the direction of the damage vector is information indicating whether the crack is a crack extending in a vertical direction in a pillar of a building or a crack extending in a direction parallel to the ground.

Figure 21:
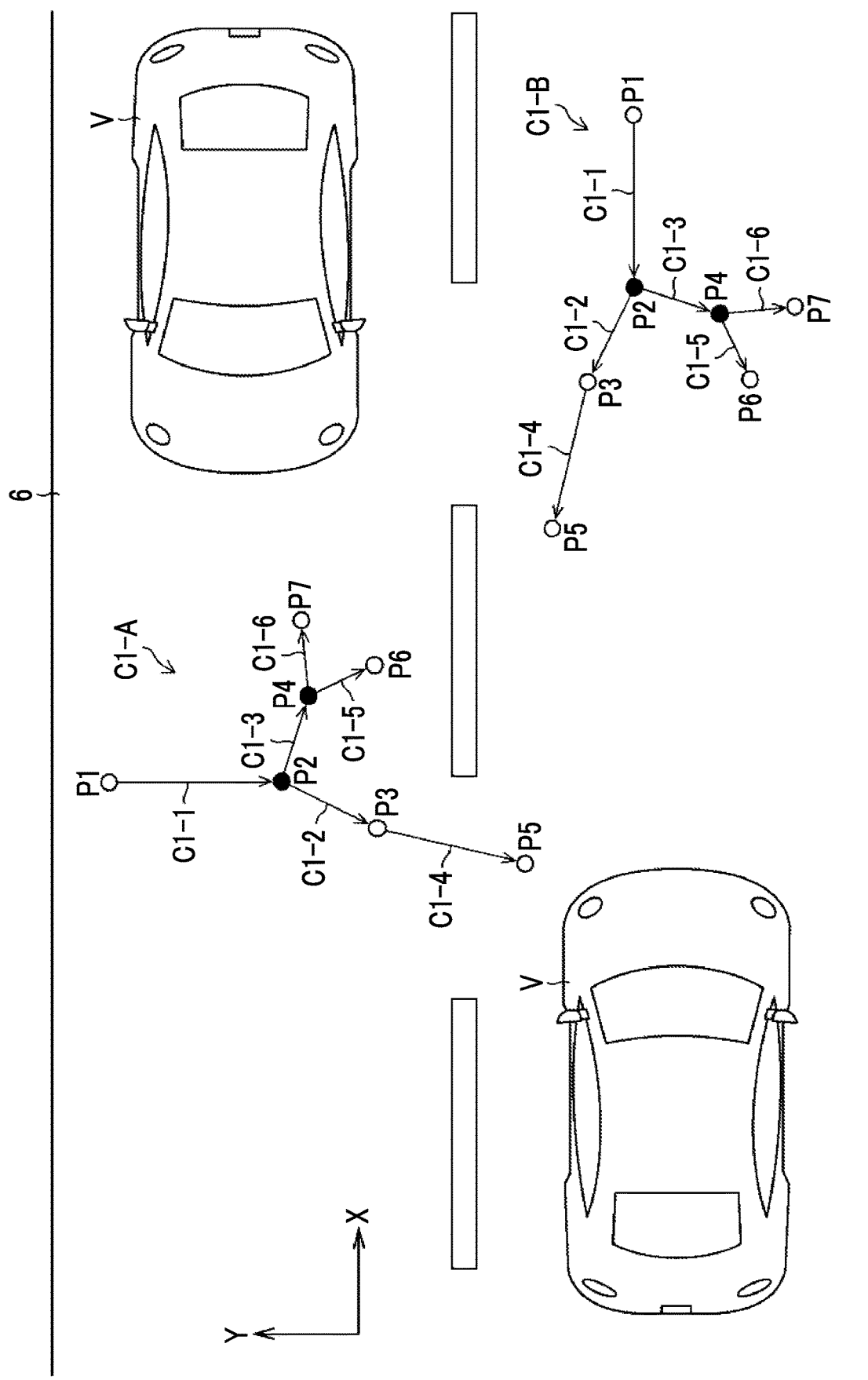
FIG. 21 is a diagram illustrating information on a direction of the damage vector.

FIG. 21 is a diagram illustrating information on the direction of the damage vector. The traveling direction of the vehicle V with respect to the deck 6 is indicated by an X axis in FIG. 21, and a direction perpendicular to the traveling direction of the vehicle V is indicated by a Y axis in FIG. 21.

Further, FIG. 22 is a table showing an example of the information on the direction of the damage vector stored in the database 155, in addition to the information stored in the database 155 described above.

In the cases illustrated in FIGS. 21 and 22, a determination is made as to whether the vector direction is longitudinal or lateral according to whether the vector direction is horizontal (X axis) or vertical (Y axis) with respect to the traveling direction of the vehicle V. It should be noted that it is desirable for information on the direction to be attached to the image so that a correspondence between the image obtained by imaging the crack and a direction of the deck 6 can be taken.

Further, data regarding the direction of the damage vector can also be attached in the vector group. For example, a direction of the vector group can be determined on the basis of a direction vector of a main trunk of the vector group. It should be noted that the above-described longitudinal direction is defined as a longitudinal direction as long as the direction is within ±45 degrees around the Y axis in FIG. 21 and the lateral direction is defined as a lateral direction as long as the direction is within ±45 degrees around the X axis in FIG. 21.

As will be described below, the information on the direction of the damage vector is stored in the database 155. That is, as illustrated in FIGS. 21 and 22, a damage vector C1-1, a damage vector C1-2, a damage vector C1-4, and a damage vector C1-5 constituting the cracks of a vector group C1-A are in the longitudinal direction which is a direction perpendicular to the traveling direction of the vehicle traveling on an upper surface of the deck 6. On the other hand, a damage vector C1-3 and a damage vector C1-6 constituting the cracks of the vector group C1-A are in the lateral direction which is a direction horizontal to the traveling direction of the vehicle V traveling on the upper surface of the deck 6.

In a case where the main trunk of the vector group C1-A is the damage vector C1-1, the damage vector C1-2, and the damage vector C1-4, the direction of the vector group C1-A can be regarded as being in the longitudinal direction. It should be noted that the direction of this vector group can be determined using various methods. For example, the direction of the vector group can also be determined using a method of calculating a direction in each element unit region (for example, each line segment approximated in a line segment) that constitutes the trunk, rather than the entire main trunk, and obtaining an average thereof.

Further, a damage vector C1-1, a damage vector C1-2, a damage vector C1-4, and a damage vector C1-5 constituting a vector group C1-B illustrated in FIGS. 21 and 22 are in the lateral direction that is a horizontal direction with respect to the traveling direction of the vehicle traveling on the upper surface of the deck 6 that is the structure. On the other hand, a damage vector C1-3 and a damage vector C1-6 constituting the cracks of C1-B are in the longitudinal direction that is a direction perpendicular to the traveling direction of the vehicle traveling on the upper surface of the deck 6 that is the structure. Further, similar to the vector group C1-A described above, in a case where a main trunk of C1-B is the damage vector C1-1, the damage vector C1-2, and the damage vector C1-4, the direction of the vector group C1-B can be set as a lateral direction.

Further, it is also possible to make a determination as to whether "the crack is unidirectional or bidirectional" in the entire deck 6 by applying the above-described concept of the longitudinal direction and the lateral direction. In this case, the determination may be made on the basis of information on a ratio of the crack vector (damage vector) in the longitudinal direction and the crack vector (damage vector) in the lateral direction or the number of crack vectors. In addition, in a case where there is a tortoiseshell crack, the crack may be determined to have a tortoiseshell shape, and the tortoiseshell crack may be regarded as being included in the longitudinal direction and the lateral direction.

Various types of information can be stored in the database 155 in association with the damage vector in addition to the above-described information.

For example, image information regarding the damage image in which the damage vector has been detected may be stored in the database 155. Here, the image information is information on the captured image in which the damage has been captured and is information in which identification information and image data of the captured image, a date and time of image acquisition, and the like are defined for a group of damage vectors. FIG. 23 is a table showing an example of the image information, in which an ID of an image, image data, a date and time of acquisition, a width and a height of the image, the number of channels, bits/pixel, and resolution have been defined for the vector group C1 (see FIG. 12). The number of channels is three for RGB (R: red, G: green, B: blue) color images, and is one for monochrome images. It should be noted that only the vector group C1 is described in FIG. 23, but the same information may be generated for each group in a case where there are a plurality of vector groups.

The information on the structure having damage may be stored in the database 155 in association with the damage vector. That is, the information on the structure having damage stored as the damage vector may be stored in the database 155. Specifically, an address, a size, and a construction date of the structure having cracks on which the deck 6 is provided may be stored in the database 155 together with the accumulated information on the cracks thereof. In this case, the search unit 153 can search for information on the structure stored in the database 155 on the basis of search results of one or a plurality of pieces of accumulated information similar to the search target information.

In addition, information on a density of the damage vectors may be stored in the database 155 as a part of the damage vector of the accumulated information. Here, the density of the damage vectors can be represented by the number of damage vectors a certain region.

Also, a link on the Internet regarding statistical information for each type of damage or damage information may be registered in the database 155. Further, text-based data such as an inspection result decided by an inspection worker or a report created by the inspection worker may be stored in the database 155 in association with the damage vector.

Next, the feature amount constituting the accumulated information and the search target information will be described. Damage structure information including the damage vector obtained by vectorizing the damage of the structure and at least one of the information on the hierarchical structure of the damage vector or the information on the direction of the damage vector includes one or a plurality of feature amounts.

Figures 24, 25:
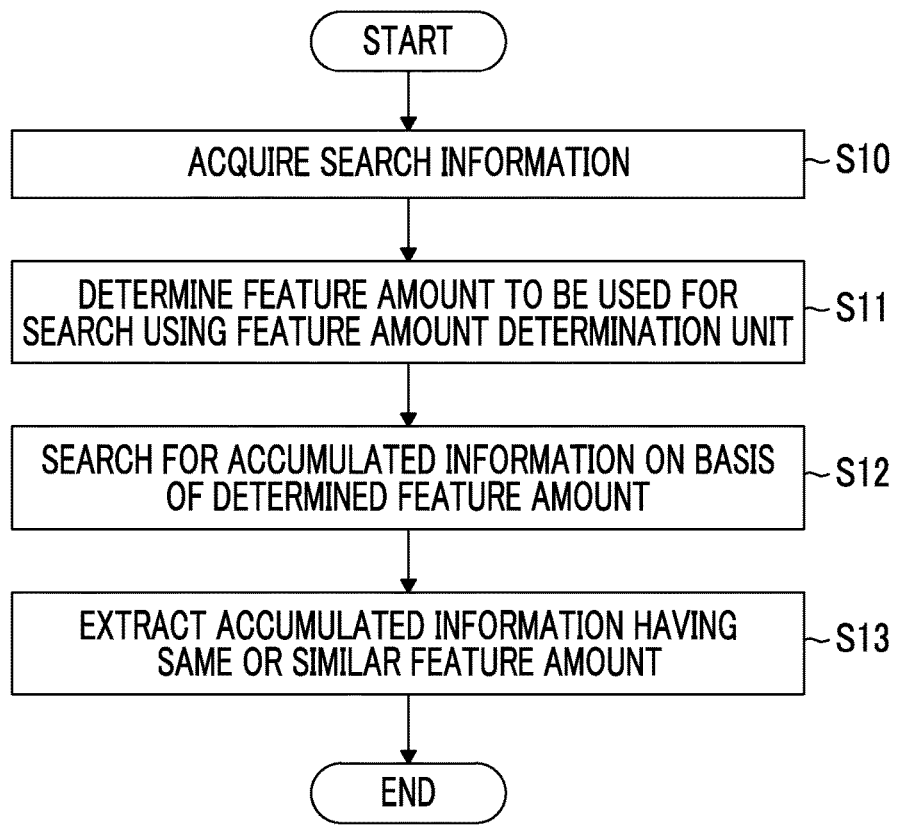
FIG. 24 is a diagram illustrating an example of a feature amount.
FIG. 25 is a flowchart illustrating an operation of the similar damage search device.

FIG. 24 is a diagram illustrating an example of a feature amount constituting the damage vector, the information on the hierarchical structure of the damage vector, the information on the direction of the damage vector. In the diagram illustrated in FIG. 24, the feature amount of the damage vector includes a start point and a termination point of the crack, a length of the crack, and a width of the crack. In addition, the feature amount of the information on the hierarchical structure of the damage vector includes the parent vector ID, the sibling vector ID, and the child vector ID. Further, the feature amount of the information on the hierarchical structure of the damage vector includes a direction with respect to the structure. The feature amount determination unit 157 (FIG. 5) described above determines the feature amount to be used for search among the feature amounts of the search target information.

Next, search using the information on the hierarchical structure of the damage vector that is performed by the search unit 153 will be described.

The search unit 153 can perform search using the information on the hierarchical structure in addition to the damage vector. For example, the search unit 153 can search for the parent vector using the width or the length of the crack of the damage vector as the primary search, and search for the sibling vector as the secondary search. Further, in the case of a vector including hierarchical information, the search unit 153 can also perform the search using only a vector equal to or higher than a certain hierarchy. That is, the search unit 153 can search for the accumulated data using only a vector equal or higher than the certain hierarchy or equal or lower than the certain hierarchy.

Next, search using the information on the direction of the damage vector that is performed by the search unit 153 will be described.

The search unit 153 can perform the search using information on the direction in addition to the damage vector. For example, the search unit 153 may search for accumulated data having the same direction as primary search, and search for a result of the primary search on the basis of the damage vector of the search target information as secondary search. Furthermore, for example, the search unit 153 may search for a crack first generated in the lateral direction or a crack first generated in the longitudinal direction in the accumulated information with respect to a vector group having cracks in two directions including the longitudinal and lateral directions, as a primary search.

FIG. 25 is a flowchart illustrating an operation of the similar damage search device.

First, the information acquisition unit 151 acquires the search target information (the second damage information) corresponding to the accumulated information (the first damage information) on the basis of a captured image obtained by imaging damage of the search target (step S10). Thereafter, the feature amount determination unit 157 determines the feature amount to be used for search among the acquired feature amounts of the search target information (step S11), and the search unit 153 performs the search within the accumulated data stored in the database 155 (step S12). The search unit 153 searches for and extracts the accumulated data having a feature amount similar to the search target information in the accumulated data.

Each of the above-described configurations and functions can be appropriately realized by any hardware, any software, or a combination of both. For example, the present invention can also be applied to a program causing a computer to execute the above-described processing steps (processing procedures), a computer-readable recording medium (a non-temporary recording medium) on which such a program is recorded, or a computer in which such a program can be installed.

Second Embodiment

Next, a second embodiment of the similar damage search device that is realized by the computer 100 will be described.

Figure 26:
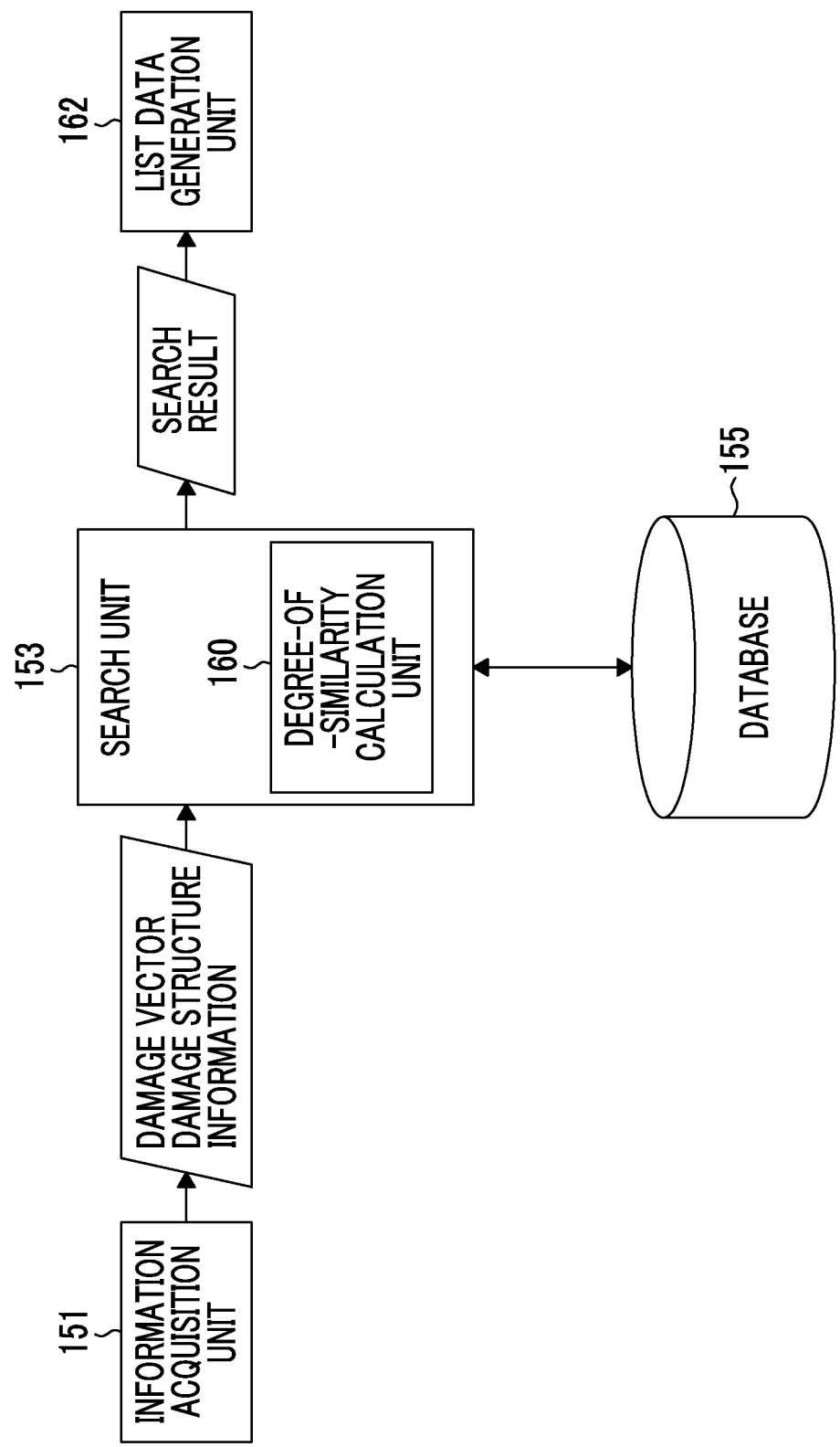
FIG. 26 is a block diagram of a similar damage search device.
Figure 27:
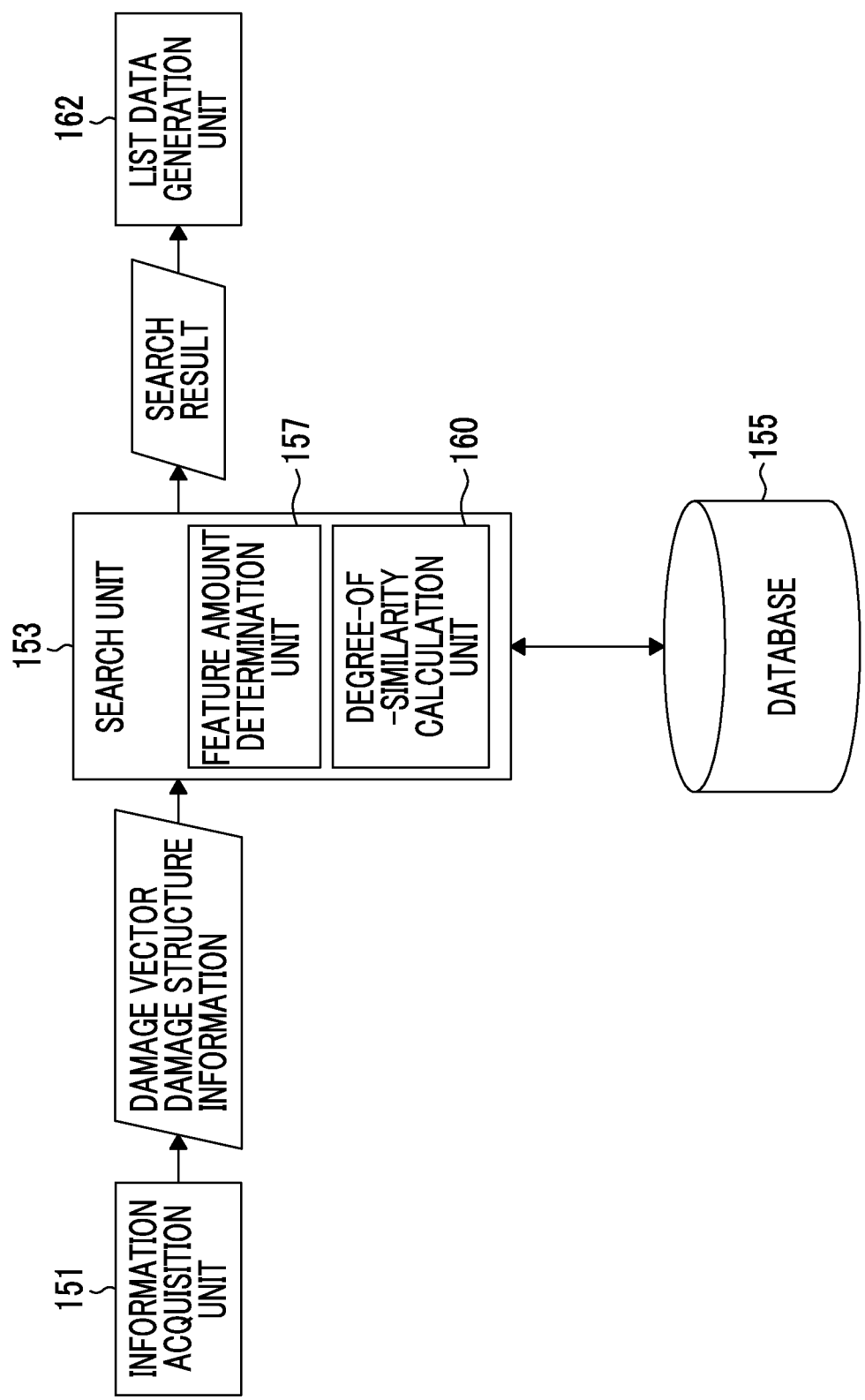
FIG. 27 is a block diagram of a similar damage search device.

FIGS. 26 and 27 are block diagrams illustrating a configuration example of the similar damage search device of the second embodiment. It should be noted that the parts already described in FIG. 5 are denoted with the same reference numerals and description thereof will be omitted.

The similar damage search device illustrated in FIG. 26 includes an information acquisition unit 151, a search unit 153, a database 155, a degree-of-similarity calculation unit 160, and a list data generation unit 162.

The degree-of-similarity calculation unit 160 calculates a degree of similarity between the search target information and the accumulated information. That is, the degree-of-similarity calculation unit 160 calculates the degree of similarity between the damage vector and the damage structure information constituting the search target information, and the damage vector and the damage structure information stored as the accumulated information. Here, the degree of similarity is calculated from, for example, a distance scale (an Euclidean distance or a Kullback-Leibler distance) between the search target information and the accumulated information, and a calculated result is normalized to, for example, a range of 0 to 1 and represented.

The search unit 153 searches for and extracts one or a plurality of pieces of accumulated information on the basis of the degree of similarity calculated by the degree-of-similarity calculation unit 160. For example, the search unit 153 extracts the accumulated information having a degree of similarity equal to or greater than a certain threshold value or equal to or smaller than the certain threshold value.

The list data generation unit 162 generates list data in which search results of the search unit 153 are sorted according to the degree of similarity. Specifically, the list data generation unit 162 receives the search results having the degree of similarity from the search unit 153 and generates the list data on the basis of the search results. Further, in the list data generated in the list data generation unit 162, it is possible to perform sorting on the basis of the degree of similarity.

The similar damage search device illustrated in FIG. 27 includes an information acquisition unit 151, a search unit 153, a database 155, a feature amount determination unit 157, a degree-of-similarity calculation unit 160, and a list data generation unit 162.

As illustrated in FIG. 27, the search unit 153 is provided with the feature amount determination unit 157 and the degree-of-similarity calculation unit 160. In a case where a plurality of feature amounts are acquired in the information acquisition unit 151, the feature amount determination unit 157 determines the feature amount to be used for search.

The degree-of-similarity calculation unit 160 calculates the degree of similarity between the feature amount of the search target information to be used for search determined in the feature amount determination unit 157 and the feature amount of the accumulated information corresponding to the feature amount determined in the feature amount determination unit 157. The search unit 153 searches the database 155 for one or a plurality of pieces of first damage information on the basis of the degree of similarity calculated in the degree-of-similarity calculation unit 160. For example, the search unit 153 extracts the accumulated information having a degree of similarity equal to or greater than a certain threshold value or equal to or smaller than the threshold value. In a case where a plurality of feature amounts are determined in the feature amount determination unit 157, each of the plurality of feature amounts is weighted according to a priority or a degree of importance. It should be noted that the priority or the degree of importance to be used in the feature amount determination unit 157 may be stored in the computer 100 in advance or may be input by the user.

Third Embodiment

Next, a third embodiment of the similar damage search (device) that is realized by the computer 100 will be described.

FIG. 28 is a block diagram illustrating a functional configuration example of the similar damage search device of the third embodiment. It should be noted that the portions already described in FIGS. 5, 26, and 27 are denoted with the same reference numerals, and description thereof will be omitted.

The similar damage search device illustrated in FIG. 28 includes an information acquisition unit 151, a search unit 153, a database 155, a feature amount determination unit 157, a degree-of-similarity calculation unit 160, a representative value determination unit 164, and a list data generation unit 162.

In a case where there are a plurality of damages in the damage image, the degree-of-similarity calculation unit 160 calculates individual degrees of similarity for the plurality of damages. That is, in a case where there are a plurality of damages in the damage image, the information acquisition unit 151 acquires the search target information regarding the plurality of damages, and the degree-of-similarity calculation unit 160 calculates the individual degrees of similarity for a plurality of search targets.

The representative value determination unit 164 determines a representative value from among the individual degrees of similarity calculated by the degree-of-similarity calculation unit 160. For example, the representative value determination unit 164 may determine one individual degree of similarity as the representative value from the plurality of individual degrees of similarity, may determine a value obtained by averaging the respective individual degrees of similarity as the representative value, or may determine a value obtained by weighting and averaging the respective individual degrees of similarity as the representative value.

The search unit 153 searches the database 155 for one or a plurality of pieces of accumulated information on the basis of the representative value determined by the representative value determination unit 164.

Although the examples of the present invention have been described, it is to be understood that the present invention is not limited to the above-described embodiments, and various modifications are possible without departing from the spirit of the present invention.

EXPLANATION OF REFERENCES

1: bridge
2: main girder
3: transverse girder
4: sway bracing
5: lateral bracing
6: deck
7: pipe
100: computer
101: casing
102: touch panel display
103: operation button
104: speaker
105: built-in camera
106: external connection terminal 110: CPU
112: system bus
114: main memory
116: nonvolatile memory
118: mobile communication unit
118A: antenna
120: wireless LAN communication unit
120A: antenna
122: near field wireless communication unit
122A: antenna
124: wired communication unit
126: display unit
128: input unit
130: key input unit
132: audio processing unit
134: image processing unit
151: information acquisition unit
153: search unit
155: database
157: feature amount determination unit
160: degree-of-similarity calculation unit
162: list data generation unit
164: representative value determination unit

What is claimed is:

1. A similar damage search device, comprising:
a memory storing a database that stores first damage information generated on the basis of a damage image of a structure, the first damage information including a damage vector obtained by vectorizing damage of the structure with a start point and a termination point of the damage, and a length of the damage, and damage structure information including information on a hierarchical structure of the damage vector, the information on the hierarchical structure of the damage vector is represented by a parent vector identification, a sibling vector identification, and a child vector identification; and
a processor executing an operation program configured to,
acquire second damage information corresponding to the first damage information on the basis of a damage image of a search target,
search for one or a plurality of pieces of first damage information similar to the second damage information from among the first damage information stored in the database on the basis of the second damage information, and
generate list data based on the search results.

2. The similar damage search device according to claim 1, wherein each of the damage vector, the information on the hierarchical structure of the damage vector, and the information on the direction of the damage vector includes one or a plurality of feature amounts, and
the operation program is further configured to,
determine a feature amount to be used for search including at least the feature amount of the damage vector, and
search the database for one or a plurality of pieces of first damage information on the basis of the feature amount.

3. The similar damage search device according to claim 1, wherein the operation program is further configured to,
calculate a degree of similarity between the second damage information and the first damage information stored in the database, and
search the database for one or a plurality of pieces of first damage information on the basis of the degree of similarity.

4. The similar damage search device according to claim 2, wherein the operation program is further configured to,
calculate a degree of similarity between the feature amount of the second damage information and the feature amount of the first damage information stored in the database, and
search the database for one or a plurality of pieces of first damage information on the basis of the degree of similarity.

5. The similar damage search device according to claim 1, wherein the operation program is further configured to,
calculate an individual degree of similarity between the second damage information and the first damage information stored in the database, for each of a plurality of search target damages in a case where there are the plurality of search target damages in the damage image of the search target,
determine a representative value among the individual degrees of similarity,
search the database for one or a plurality of pieces of first damage information on the basis of the representative value.

6. The similar damage search device according to claim 1, wherein the information on the hierarchical structure of the damage vector includes at least information on the damage vector that becomes a trunk through branching or information on the damage vector that becomes a branch through branching.

7. The similar damage search device according to claim 4, wherein the search results are sorted according to the degree of similarity in the list data.

8. The similar damage search device according to claim 1,
wherein the database stores information on a structure having the damage in association with the first damage information, and
the operation program is further configured to search for information on the structure stored in the database on the basis of search results of one or a plurality of pieces of first damage information similar to the second damage information.

9. The similar damage search device according to claim 1,
wherein the database stores a repair record of the damage in association with the first damage information, and
the operation program is further configured to search for the repair record stored in the database on the basis of search results of one or a plurality of pieces of first damage information similar to the second damage information.

10. The similar damage search device according to claim 1,
wherein the database stores first damage information having damage structure information including information on a direction of the damage vector.

11. A similar damage search method, comprising the steps of:
storing first damage information generated on the basis of a damage image of a structure in a database, the first damage information including a damage vector obtained by vectorizing damage of the structure with a start point and a termination point of the damage, and a length of the damage, and damage structure information including information on a hierarchical structure of the damage vector, the information on the hierarchical structure of the damage vector is represented by a parent vector identification, a sibling vector identification, and a child vector identification;

acquiring second damage information corresponding to the first damage information on the basis of a damage image of a search target;
searching for one or a plurality of pieces of first damage information similar to the second damage information from among the first damage information stored in the database on the basis of the second damage information; and
generating list data based on the search results.

* * * * *